(12) United States Patent
Ishii et al.

(10) Patent No.: US 8,274,940 B2
(45) Date of Patent: Sep. 25, 2012

(54) BASE STATION APPARATUS AND COMMUNICATION CONTROL METHOD

(75) Inventors: Hiroyuki Ishii, Yokosuka (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 464 days.

(21) Appl. No.: 12/527,945

(22) PCT Filed: Feb. 21, 2008

(86) PCT No.: PCT/JP2008/052978
§ 371 (c)(1),
(2), (4) Date: Aug. 20, 2009

(87) PCT Pub. No.: WO2008/105316
PCT Pub. Date: Sep. 4, 2008

(65) Prior Publication Data
US 2010/0091724 A1    Apr. 15, 2010

(30) Foreign Application Priority Data

Feb. 28, 2007    (JP) .................................. 2007-050835
Jun. 19, 2007    (JP) .................................. 2007-161939

(51) Int. Cl.
*H04W 4/00*    (2009.01)
*G08C 17/00*    (2006.01)

(52) U.S. Cl. .......................... 370/329; 370/311; 370/328
(58) Field of Classification Search ........................ None
See application file for complete search history.

(56) References Cited

U.S. PATENT DOCUMENTS

| 6,934,268 B1 * | 8/2005 | Hedlund et al. ............. 370/311 |
| 2005/0143018 A1 | 6/2005 | Shinozaki |
| 2006/0007849 A1 * | 1/2006 | Kim et al. ..................... 370/208 |
| 2007/0189199 A1 * | 8/2007 | Nishio .......................... 370/328 |

FOREIGN PATENT DOCUMENTS

| JP | 2002-190774 A | 7/2002 |
| JP | 2006-311465 A | 11/2006 |
| WO | 2004/066661 A1 | 8/2004 |
| WO | 2005/032015 A1 | 4/2005 |

OTHER PUBLICATIONS

International Search Report w/translation from PCT/JP2008/052978 dated Jun. 3, 2008 (4 pages).
Written Opinion from PCT/JP2008/052978 dated Jun. 3, 2008 (4 pages).

(Continued)

*Primary Examiner* — Faruk Hamza
*Assistant Examiner* — Diane Lo
(74) *Attorney, Agent, or Firm* — Osha Liang LLP

(57) ABSTRACT

A base station apparatus is disclosed that includes a selection unit selecting user equipment terminals to which radio resources are allocated based on priority levels indicating a priority order of allocating the radio resources for a shared channel and a resource determination unit determining a transmission power level of a control channel and resources for the control channel, the control channel indicating communications of the shared channel to the selected user equipment terminals. In the base station apparatus, when the sum of the transmission power of the control channel related to the selected user equipment terminals exceeds a predetermined first threshold value or when a sum of control resources for the control channel related to the selected user equipment terminals exceeds a predetermined second threshold value, the resource determination unit transmits the control channel to some user equipment terminals among the selected user equipment terminals.

7 Claims, 11 Drawing Sheets

OTHER PUBLICATIONS

Patent Abstracts of Japan; Publication No. 2002-190774 dated Jul. 5, 2002; NTT DoCoMo, Inc. (1 page).

Patent Abstracts of Japan; Publication No. 2006-311465 dated Nov. 9, 2006; NTT DoCoMo, Inc. (1 page).

3GPP TSG RAN WG1 Meeting #47 bis; R1-070105; "ACK/NACK Signal Structure in E-UTRA Downlink"; Sorrento, Italy, Jan. 15-19, 2007 (3 pages).

3GPP TSG RAN WG Meeting #47bis; R1-070103; "Downlink L1/L2 Control Signaling Channel Structure: Coding"; Sorrento, Italy, Jan. 15-19, 2007 (17 pages).

3GPP TS 36.211 V0.3.1: "Physical Channels and Modulation"; Feb. 2007 (28 pages).

3GPP TR 25.814, V7.0.0; "Physical Layer Aspects for Evolved Universal Terrestrial Radio Access (UTRA)"; Jun. 2006 (126 pages).

* cited by examiner

BASE STATION APPARATUS AND COMMUNICATION CONTROL METHOD

TECHNICAL FIELD

The present invention generally relates to a mobile communication system employing an Orthogonal Frequency Division Multiplexing (OFDM) scheme, and more particularly to a base station apparatus and a communication control method.

BACKGROUND ART

As a next-generation system of the W-CDMA (Wideband Code Division Multiple Access) and the HSDPA (High Speed Downlink Packet Access), an LTE system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communication system, respectively (see, for example, Non Patent Document 1).

In the OFDM scheme, a frequency band is divided into plural sub-carriers having narrower frequency bands, and data are transmitted on each sub frequency band and the sub-carriers are closely arranged so as not to interfere with each other, so that fast data transmission can be achieved and an efficiency use of the frequency band can be improved.

In the SC-FDMA scheme, a frequency band is divided in a manner so that different frequencies can be separately used among plural terminals (user equipment terminals) and as a result, interferences between terminals can be reduced. Further, in the SC-FDMA scheme, a range of transmission power fluctuation can be made smaller; therefore lower energy consumption of terminals can be achieved and a wider coverage area can be obtained.

In the LTE system, communications are performed by sharing one or more physical channels among plural mobile stations (user equipment (UE) terminals). The channel shared among plural mobile terminals is generally called a shared channel. In the LTE system, a Physical Uplink Shared Channel (PUSCH) and a Physical Downlink Shared Channel (PDSCH) are the shared channels in uplink and downlink, respectively. Further, the transport channels (TrCH) to be mapped over the PUSCH and PDSCH are an Uplink-Shared Channel (UL-SCH) and a Downlink-Shared Channel (DL-SCH), respectively.

Further, in a communication system using the shared channels as described above, signaling is required for allocating the shared channels to the corresponding mobile stations (UE terminals) in each sub-frame. In the LTE system, the channel used for the signaling is called a Physical Downlink Control Channel (PDCCH) or Downlink L1/L2 Control Channel (DL L1/L2 Control channel). The information items of the Physical Downlink Control Channel (PDCCH) includes, for example, a DL L1/L2 Control Channel Format Indicator, DL (Downlink) Scheduling Information, Acknowledgement information (UL ACK/NACK), Uplink Scheduling Grant, an Overload Indicator, and a Transmission Power Control Command Bit (TPC bit) (see Non Patent Document 2). The DL L1/L2 Control Format Indicator may also be called a Physical Control Format Indicator Channel (PCFICH), and the UL ACK/NACK may also be called a Physical Hybrid ARQ Indicator Channel (PHICH). However, the PCFICH and the PHICH are not necessarily included in the PDCCH and may be defined as separate physical channels having a parallel relationship with the Physical Downlink Control Channel (PDCCH).

Further, the DL Scheduling Information includes, for example, allocation information of downlink resource blocks, an ID of user equipment (UE) (hereinafter may be referred to as a user equipment (UE) terminal), the number of streams, information of a Precoding Vector, data size, a modulation scheme, and information of HARQ (Hybrid Automatic Repeat reQuest). The DL Scheduling Information may also be called DL Assignment Information or DL Scheduling Grant. Further, the UL Scheduling Grant includes, for example, allocation information of uplink resource blocks, the ID of user equipment (UE), the data size, the modulation scheme, power information of the uplink transmission, and information of a Demodulation Reference Signal.

The Physical Downlink Control Channel (PDCCH) is transmitted by using first L symbols (L=1, 2, 3) in one sub-frame (see Non Patent Document 3). Further, in the first L symbol(s) of the PDCCH, the information items of the PDCCH are being multiplexed, the information items including, more specifically, the DL L1/L2 Control Channel Format Indicator, the Downlink Scheduling Information, the Acknowledgement information (UL ACK/NACK), the Uplink Scheduling Grant, the Overload Indicator, and the Transmission Power Control Command Bit (TPC bit). In this case, in order to efficiently multiplex the information items of the PDCCH, transmission power control is applied to each of the information items of the PDCCH.

Non Patent Document 1: 3GPP TR 25.814 (V7.0.0), "Physical Layer Aspects for Evolved UTRA," June 2006

Non Patent Document 2: R1-070103, Downlink L1/L2 Control Signaling Channel Structure: Coding Non Patent Document 3: 3GPP TS 36.211 (v 0.3.1), "Physical Channels and Modulation," February 2007

Non Patent Document 4: R1-070105, ACK/NACK Signal Structure in E-UTRA Downlink, January 2007

DISCLOSURE OF INVENTION

Problems to be Solved by the Invention

Transmission power control is applied to each of the information items transmitted in the Physical Downlink Control Channel (PDCCH) in the LTE system, as described above, the information items including the DL L1/L2 Control Channel Format Indicator, the Downlink Scheduling Information, the Acknowledgement information (UL ACK/NACK), the Uplink Scheduling Grant, the Overload Indicator, and the Transmission Power Control Command Bit (TPC bit). The Downlink Scheduling Information indicates identification information of the user equipment communicating using a shared channel in the sub-frame in downlink and a transmission format of the shared channel. The Uplink Scheduling Grant indicates identification information of the user equipment communicating using a shared channel in a predetermined sub-frame in uplink and a transmission format of the shared channel.

However, among the information items transmitted in the PDCCH, if the data of the Downlink Scheduling Information or the Uplink Scheduling Grant, namely, the information indicating the identification of the user equipment communicating using the shared channel in the sub-frame and the transmission format of the shared channel are wrongly transmitted, the shared channel may not be transmitted and as a result, the communications quality may be degraded. For example, as a result of the transmission power control, when the transmission power allocated to the transmission of the identification information of the user equipment communicating using the shared channel in the sub-frame and the transmission of the information indicating the transmission format of the shared channel are less than necessary, the user equipment may not be able to correctly decode the identification information of the user equipment communicating using the shared channel in the sub-frame and the information indicating the transmission format of the shared channel, and as a result, the communications using the shared channel may not be performed.

In other words, it may be necessary to perform the transmission power control by taking into consideration the communications quality (e.g., an error rate) of the identification information of the user equipment communicating using the shared channel in the sub-frame and the information indicating the transmission format of the shared channel.

To that end, the present invention may provide a base station apparatus and a communication control method capable of adequately performing the transmission power control of the identification information of the user equipment communicating using the shared channel in the sub-frame and the information indicating the transmission format of the shared channel.

Means for Solving the Problems

According to an aspect of the present invention, there is provided a base station apparatus capable of communicating with a plurality of user equipment terminals using a shared channel. The base station apparatus includes a selection unit selecting user equipment terminals to which radio resources are allocated based on priority levels indicating a priority order of allocating the radio resources for the shared channel; and a resource determination unit determining a transmission power of a control channel and resources for the control channel, the control channel indicating communications of the shared channel to the selected user equipment terminals. Further in the base station apparatus, when a sum of the transmission power of the control channel related to the selected user equipment terminals exceeds a predetermined first threshold value or when a sum of control resources for the control channel related to the selected user equipment terminals exceeds a predetermined second threshold value, the resource determination unit transmits the control channel to some user equipment terminals among the selected user equipment terminals.

According to another aspect of the present invention, there is provided a base station apparatus capable of communicating with a plurality of user equipment terminals using a shared channel in uplink and downlink and transmitting a control signal in downlink for the shared channel in uplink and downlink. The base station apparatus includes a transmission power calculation unit calculating a transmission power of the control signal;

a resource element number counting unit counting a number of resource elements for the control signal; and an OFDM symbol number determination unit determining a number of OFDM symbols for the control signal based on the transmission power and the number of resource elements.

According to another aspect of the present invention, there is provided a communication control method employed in a base station apparatus capable of communicating with a plurality of user equipment terminals using a shared channel. The method includes a first selection step of selecting user equipment terminals to which radio resources are allocated based on priority levels indicating a priority order of allocating the radio resources for the shared channel;

a determination step of determining a transmission power of a control channel and resources for the control channel, the control channel indicating communications of the shared channel to the selected user equipment terminals;

a second selection step of selecting user equipment terminals to which the radio resources are allocated based on the priority levels indicating the priority order of allocating the radio resources; and a transmission power control step of controlling a transmission power of a control channel to the selected user equipment terminals. Further, in the determination step of this method, when a sum of the transmission power of the control channel related to the selected user equipment terminals exceeds a predetermined first threshold value or when a sum of control resources for the control channel related to the selected user equipment terminals exceeds a predetermined second threshold value, the control channel is transmitted to some user equipment terminals among the selected user equipment terminals.

Advantageous Effect of the Invention

According to an embodiment of the present invention, there may be provided a base station apparatus and a communication control method capable of adequately performing the transmission power control of the identification information of the user equipment communicating using the sub-frame of the shared channel and the information indicating the transmission format of the shared channel.

Figure 1:
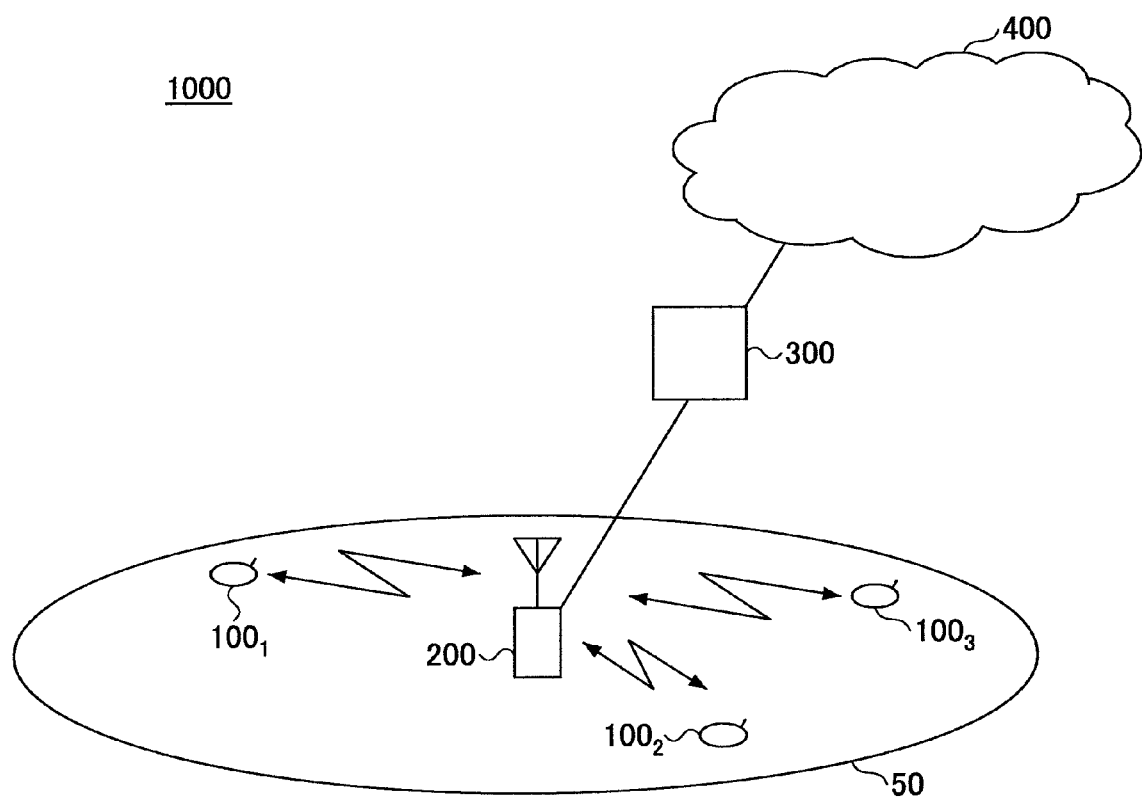
FIG. 1 is a block diagram showing a configuration of a radio communication system according to an embodiment of the present invention.

EXPLANATION OF REFERENCES $100_1$, $100_2$, $100_3$, $100_n$: USER EQUIPMENT TERMINAL (S)
200: BASE STATION APPARATUS
202: TRANSMISSION/RECEIVING ANTENNA
204: AMPLIFIER
206: TRANSMISSION/RECEIVING SECTION
208: BASEBAND SIGNAL PROCESSING SECTION
210: CALL PROCESSING SECTION
212: CHANNEL INTERFACE
2081: LAYER 1 PROCESSING SECTION
2082: MAC PROCESSING SECTION
2083: RLC PROCESSING SECTION
2084: DL TRANSMISSION POWER DETERMINATION SECTION
300: ACCESS GATEWAY
400: CORE NETWORK

BEST MODE FOR CARRYING OUT THE INVENTION

Next, a best mode for carrying out the present invention is described based on the embodiments described below with reference to the accompanying drawings.

Throughout the figures for illustrating the embodiments of the present invention, the same reference numerals are used for the same or equivalent elements and the repeated descriptions thereof may be omitted.

First, a radio communication system having a base station apparatus according to an embodiment of the present invention is described with reference to FIG. 1.

As shown in FIG. 1, the radio communication system 1000, which may be an Evolved UTRA (Universal Terrestrial Radio Access) and UTRAN (UTRA Network) system (a.k.a an LTE (Long Term Evolution) system or a super 3G system), includes a base station apparatus (eNB: eNode B) 200 and plural user equipment (UE) $100_n$ ($100_1$, $100_2$, $100_3$, ... $100_n$; n: an integer greater than zero (0)) (hereinafter, the user equipment (UE) may be referred to as a user equipment terminal(s)). The base station apparatus 200 is connected to an upper node station such as an access gateway 300. The access gateway 300 is connected to a core network 400. In this case, the user equipment (UE) terminals $100_n$ are in communication with the base station apparatus 200 in a cell 50 using the Evolved UTRA and UTRAN radio communication scheme.

Each of the user equipment terminals ($100_1$, $100_2$, $100_3$, ... $100_n$) has the same configuration, functions, and status. Therefore, in the following, unless otherwise described, the term user equipment (UE) $100_n$ may be collectively used in the following descriptions. For explanation purposes, the term user equipment (UE) is used as a terminal to be in wireless communication with the base station apparatus. However, generally, a mobile terminal and a fixed terminal may also be applied to such a device.

As the radio access scheme in the radio communication system 1000, the OFDM (Orthogonal Frequency Division Multiplexing) scheme and the SC-FDMA (Single-Carrier Frequency Division Multiplexing Access) scheme are used in downlink and uplink communications, respectively. As described above, the OFDM scheme is a multi-carrier transmission scheme in which a frequency band is divided into plural sub-carriers having narrow frequency bands and data are mapped on each sub-carrier to be transmitted. The SC-FDMA scheme is a single-carrier transmission scheme in which a frequency band is divided so that different frequencies can be used among plural terminals and as a result, interferences between terminals can be reduced.

Next, communication channels used in the Evolved UTRA and UTRAN radio communication scheme are described.

In downlink communications, a Physical Downlink Shared Channel (PDSCH) shared among the user equipment terminals $100_n$ and a Physical Downlink Control Channel (PDCCH) are used. The Physical Downlink Control Channel (PDCCH) may also be called a Downlink L1/L2 Control Channel (DL L1/L2 Control Channel). User data (i.e. a normal data signal) are transmitted via the Physical Downlink Shared Channel (PDSCH). Further, via the Physical Downlink Control Channel (PDCCH), a Downlink L1/L2 Control Channel Format Indicator (DL L1/L2 Control Channel Format Indicator), Downlink Scheduling Information (DL Scheduling Information), Acknowledgement information (UL ACK/NACK), Uplink Scheduling Grant, an Overload Indicator, a Transmission Power Control Command Bit (TPC bit) and the like are transmitted.

The DL Scheduling Information may also be called DL Assignment Information or DL Scheduling Grant.

Further, the DL L1/L2 Control Format Indicator may also be called a Physical Control Format Indicator Channel (PCFICH). Further, the UL ACK/NACK may also be called a Physical Hybrid ARQ Indicator Channel (PHICH). In the embodiment of the present invention, the PCFICH, the PHICH, and the Transmission Power Control Command Bit are defined to be included in the PDCCH. However, alternatively, the PCFICH, the PHICH, and the Transmission Power Control Command Bit may be defined as separate physical channels having a parallel relationship with the PDCCH.

The DL Scheduling Information includes, for example, information indicating the identification (ID) of the user equipment to communicate using the Physical Downlink Shared Channel (PDSCH); information items indicating the transport format of the user data, namely information items indicating the data size, and the modulation scheme; information of HARQ (Hybrid Automatic Repeat reQuest); allocation information of downlink resource blocks and the like. Further, the Uplink Scheduling Grant includes, for example, an information item indicating the identification (ID) of the user equipment to communicate using the Physical Uplink Shared Channel (PUSCH) in the sub-frame, information items indicating a transport format of the user data, namely information items indicating the data size and the modulation scheme, the allocation information of uplink resource blocks, information items indicating the transmission power of the uplink shared channel and the like. Herein, the uplink resource blocks correspond to frequency resources and may also be called resource units.

Further, the Acknowledgement information (UL ACK/NACK) herein refers to Acknowledgement Information of the uplink shared channel.

In uplink communications, a Physical Uplink Shared Channel (PUSCH) shared among the user equipment terminals $100_n$ and a Physical Uplink Control Channel (PUCCH) are used. User data (i.e. a normal data signal) are transmitted via the Physical Uplink Shared Channel (PUSCH). Via the Physical Uplink Control Channel (PUCCH), Downlink Channel Quality Indicators (CQI) to be used for a scheduling process of the Physical Downlink Shared Channel (PDSCH) and an Adaptive Modulation and Coding Scheme (AMCS) and the Acknowledgement Information of the Physical Downlink Shared Channel (PDSCH) are transmitted. The Acknowledgement Information is expressed by either "Acknowledgement (ACK)" indicating that the transmission signal has been successfully received or "Negative Acknowledgement (NACK)" indicating that the transmission signal has not been successfully received.

Via the Physical Uplink Control Channel (PUCCH), in addition to the Downlink Channel Quality Indicators (CQI) and the Acknowledgement Information, a Scheduling Request for requesting the allocation of the resources of the uplink shared channel and a Release Request in Persistent Scheduling and the like may also be transmitted. Herein, the term "allocation of the resources of the uplink shared channel" means that the base station apparatus reports information to the user equipment by using a certain Physical Downlink Control Channel (PDCCH) in a sub-frame, the information indicating that the user equipment can communicate using the Uplink shared channel in the following sub-frames.

Figure 2:
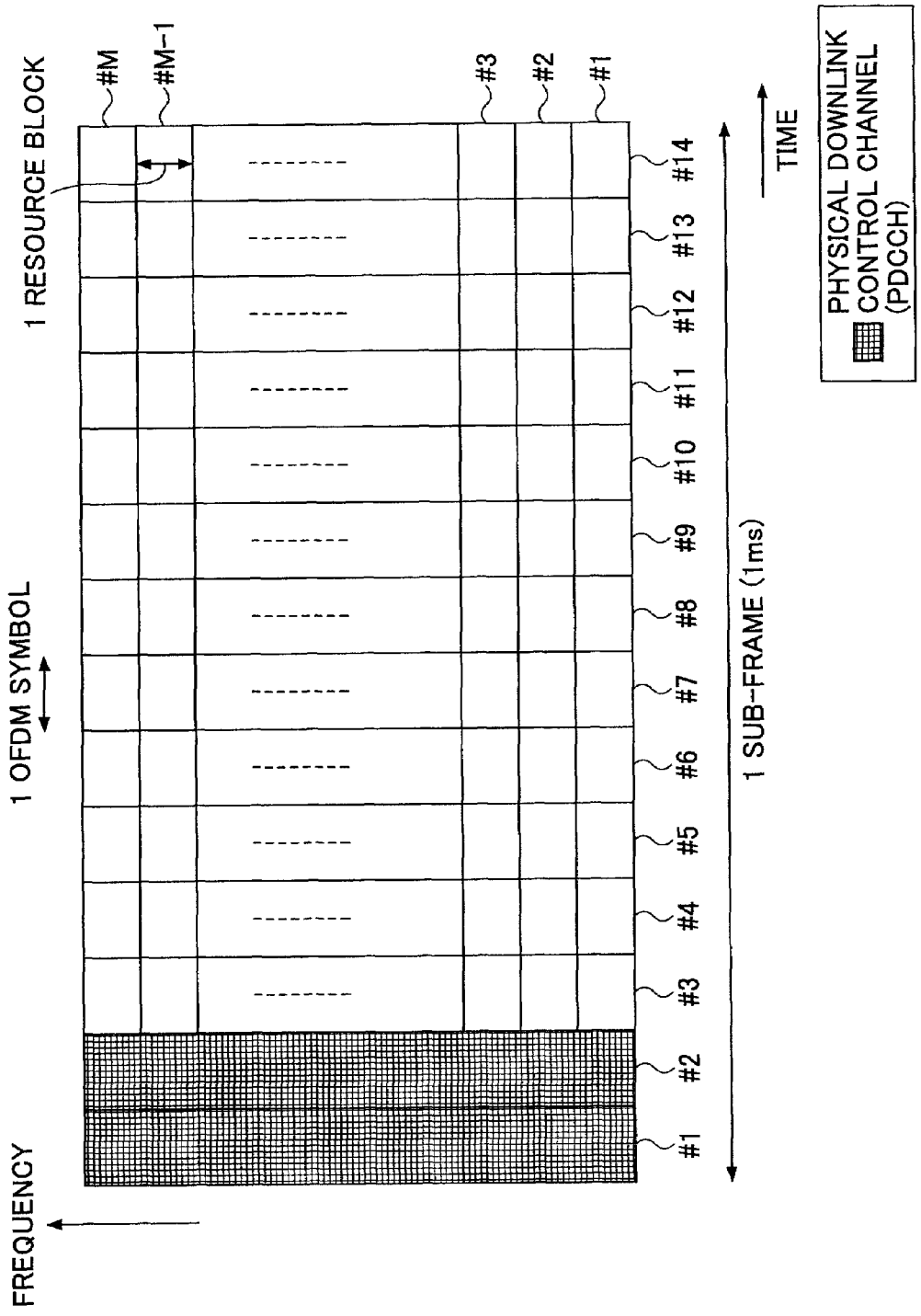
FIG. 2 is a drawing showing an exemplary sub-frame configuration.

In downlink transmissions, as shown in FIG. 2, for example, the length of one sub-frame is 1 ms and there are fourteen (14) OFDM symbols in one sub-frame. In FIG. 2, the numbers along the time (lateral) axis (#1, #2, #3, . . . #14) refer to the numbers identifying the OFDM symbols, and the numbers along the frequency (vertical) axis (#1, #2, #3, . . . #M−1, #M; M: an integer greater than zero (0)) refers to the numbers identifying Resource Blocks.

The Physical Downlink Control Channel (PDCCH) is mapped to the first M OFDM symbols (from the left-hand edge) in one sub-frame. The symbol M denotes any value in a rage of 1, 2, and 3 (one of three values). In the example of FIG. 2, the Physical Downlink Control Channel (PDCCH) is mapped to the first two (2) OFDM symbols in one sub-frame (M=2); namely, the Physical Downlink Control Channel (PDCCH) is mapped to the OFDM symbols #1 and #2; and by using the OFDM symbols other than the OFDM symbols to which the Physical Downlink Control Channel (PDCCH) is mapped, user data, Synchronization Channel (SCH), Broadcast Channel (BCH), data signal in Persistent Scheduling and the like are transmitted.

Further, along the frequency direction in FIG. 2, M resource blocks are defined (this symbol M denotes the number of resource blocks in the frequency direction). In this case, the frequency band per one resource block is, for example, 180 kHz, and there are twelve (12) sub-carriers in one resource block. A value of M (which denotes the number of resource blocks in the frequency direction) is 25, 50, or 100 when the system bandwidth is 5 MHz, 10 MHz, or 20 MHz, respectively.

Figure 3:
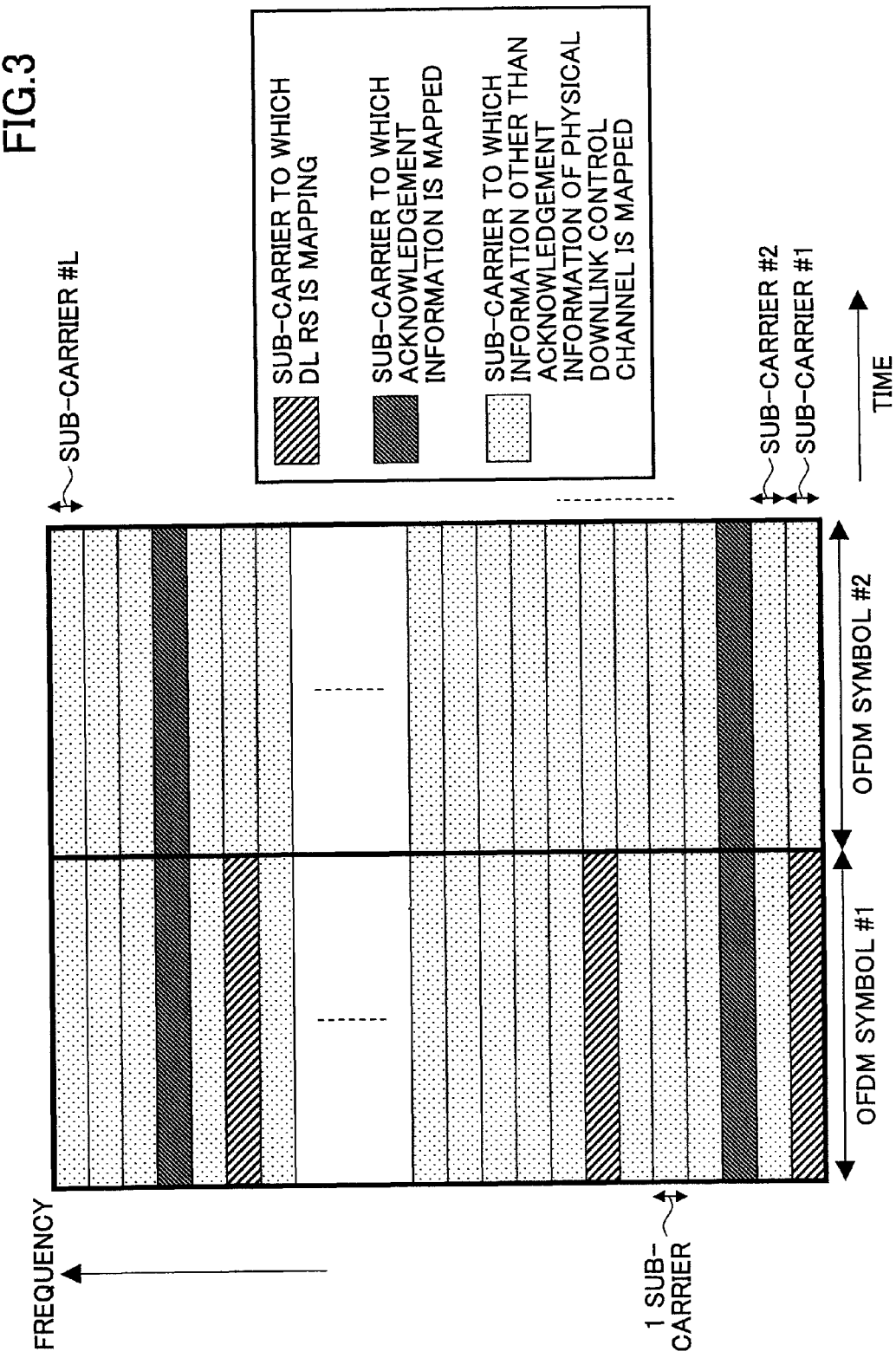
FIG. 3 is a drawing showing an exemplary mapping of sub-carriers in OFDM symbols #1 and #2.

FIG. 3 shows an example of sub-carrier mapping to the OFDM symbols upon the sub-frame having the configuration as shown in FIG. 2. In FIG. 3, a symbol L denotes the number of sub-carriers that can be mapped to one OFDM symbol (L is an integer greater than zero (0)), so that the sub-carriers are numbered as sub-carrier #1, #2, . . . , #L in increasing order from the subcarrier having the smallest frequency. In this case, a value of L (which denotes the number of sub-carriers in the frequency direction) is 300, 600, or 1,200 when the system bandwidth is 5 MHz, 10 MHz, or 20 MHz, respectively. As shown in FIG. 3, a Downlink Reference Signal (DL RS) and the Physical Downlink Control Channel (PDCCH) are mapped to the sub-carriers of the OFDM symbol #1, and the Physical Downlink Control Channel (PDCCH) is mapped to the sub-carriers of the OFDM symbol #2.

The Downlink Reference Signal (DL RS) is transmitted by one sub-carrier out of every six (6) sub-carriers in the OFDM symbol #1. In the case of FIG. 3, the Downlink Reference Signals (DL RS) are mapped to sub-carrier #6×d−5 (d: 1, 2, . . . ), and the Physical Downlink Control Channel (PDCCH) is mapped to the sub-carriers other than the sub-carriers to which the Downlink Reference Signals (DL RS) are mapped. FIG. 3 shows a case where the Acknowledgement information (UL ACK/NACK) as the information item to be transmitted via the Physical Downlink Control Channel (PDCCH) is mapped to sub-carrier #3 and sub-carrier #L−3. In this case, the number of sub-carriers to which the Acknowledgement information (UL ACK/NACK) is mapped may be determined based on the maximum number of the user equipment terminals to be multiplexed in one sub-frame in uplink, namely, the maximum number of the user equipment terminals transmitting the uplink shared channel in one sub-frame.

The configuration of the OFDM symbol #3 in a case where the number of OFDM symbols to be mapped to the Physical Downlink Control Channel (PDCCH) is three (3) is basically the same as that of the OFDM symbol #2 in FIG. 3.

Next, the base station apparatus 200 according to an embodiment of the present invention is described with reference to FIG. 4.

Figure 4:
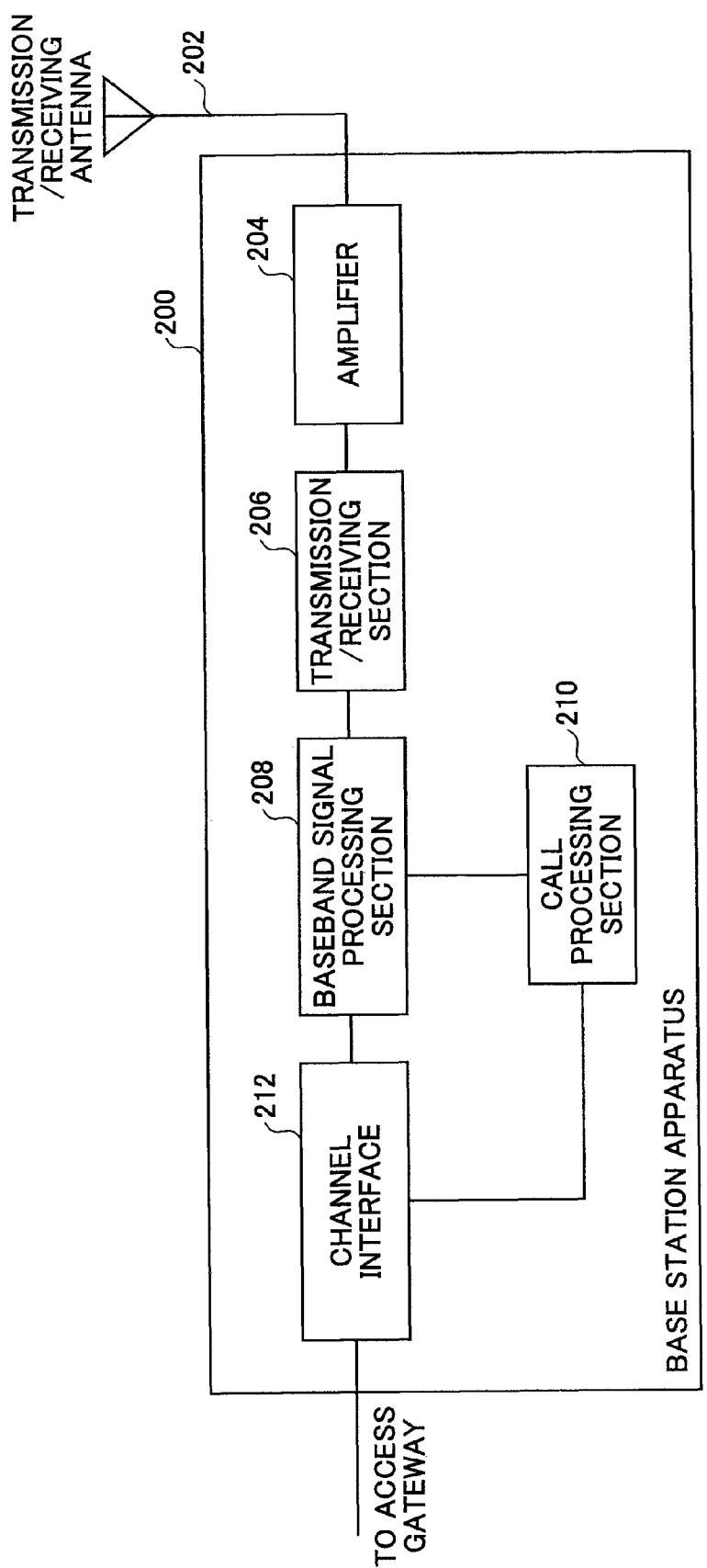
FIG. 4 is a partial block diagram showing a base station apparatus according to an embodiment of the present invention.

As shown in FIG. 4, the base station apparatus 200 includes a transmission/receiving antenna 202, an amplifier 204, a transmission/receiving section 206, a baseband signal processing section 208, a call processing section 210, and a channel interface 212.

The packet data transmitted from the base station apparatus 200 to the user equipment (UE) $100_n$ in downlink are input from an upper node station of the base station apparatus 200 such as an access gateway 300 to the baseband signal processing section 208 through the channel interface 212.

The baseband signal processing section 208 performs a PDCP (Packet Data Convergence Protocol) layer process such as adding sequence numbers, a concealing process using the sequence numbers, an RLC (Radio Link Control) layer process such as segmentation and concatenation of packet data and a transmission process of RLC retransmission control, MAC (Medium Access Control) retransmission control such as an HARQ (Hybrid Automatic Repeat reQuest) transmission process, a scheduling process, a transmission format selection process, a channel coding process, and an IFFT (Inverse Fast Fourier Transformation) process and transmits the resulting output to the transmission/receiving section 206. Further, as is described below, the baseband signal processing section 208 determines the transmission power allocated to, for example, the resource blocks (or sub-carriers) in each sub-frame and the Downlink Reference Signal (DL RS), the Physical Downlink Control Channel (PDCCH), user data (Downlink-Shared Channel (DL-SCH) as the transport channel (TrCH)), Synchronization Channel (SCH), Broadcast Channel (BCH), and the data signal in Persistent Scheduling in each OFDM symbol.

The transmission/receiving section 206 performs a frequency conversion process from a baseband signal to a signal in a radio-frequency band, the baseband signal being output from the baseband signal processing section 208. Then, the signal in the radio-frequency band is amplified by the amplifier 204 and transmitted through the transmission/receiving antenna 202.

On the other hand, regarding the data transmitted from the user equipment (UE) $100_n$ to the base station apparatus 200 in uplink, a radio-frequency band signal is received by the transmission/receiving antenna 202, amplified by the amplifier 204, frequency-converted from the radio-frequency band signal to a baseband signal by the transmission/receiving section 206, and input to the baseband signal processing section 208.

The baseband signal processing section 208 performs an FFT (Fast Fourier Transformation) process, an IDFT (Inverse Discrete Fourier Transformation) process, an error-correcting decoding process, a receiving process of the MAC retransmission control, a receiving process of the RLC layer (data) and the PDCP layer (data) on the input baseband signal and transmits the resulting output to the access gateway 300 through the channel interface 212.

The call processing section 210 performs call processing operations such as establishing and releasing a communication channel and manages the status of the base station apparatus 200 and radio resources.

Next, an exemplary configuration of the baseband signal processing section 208 is described with reference to FIG. 5.

Figure 5:
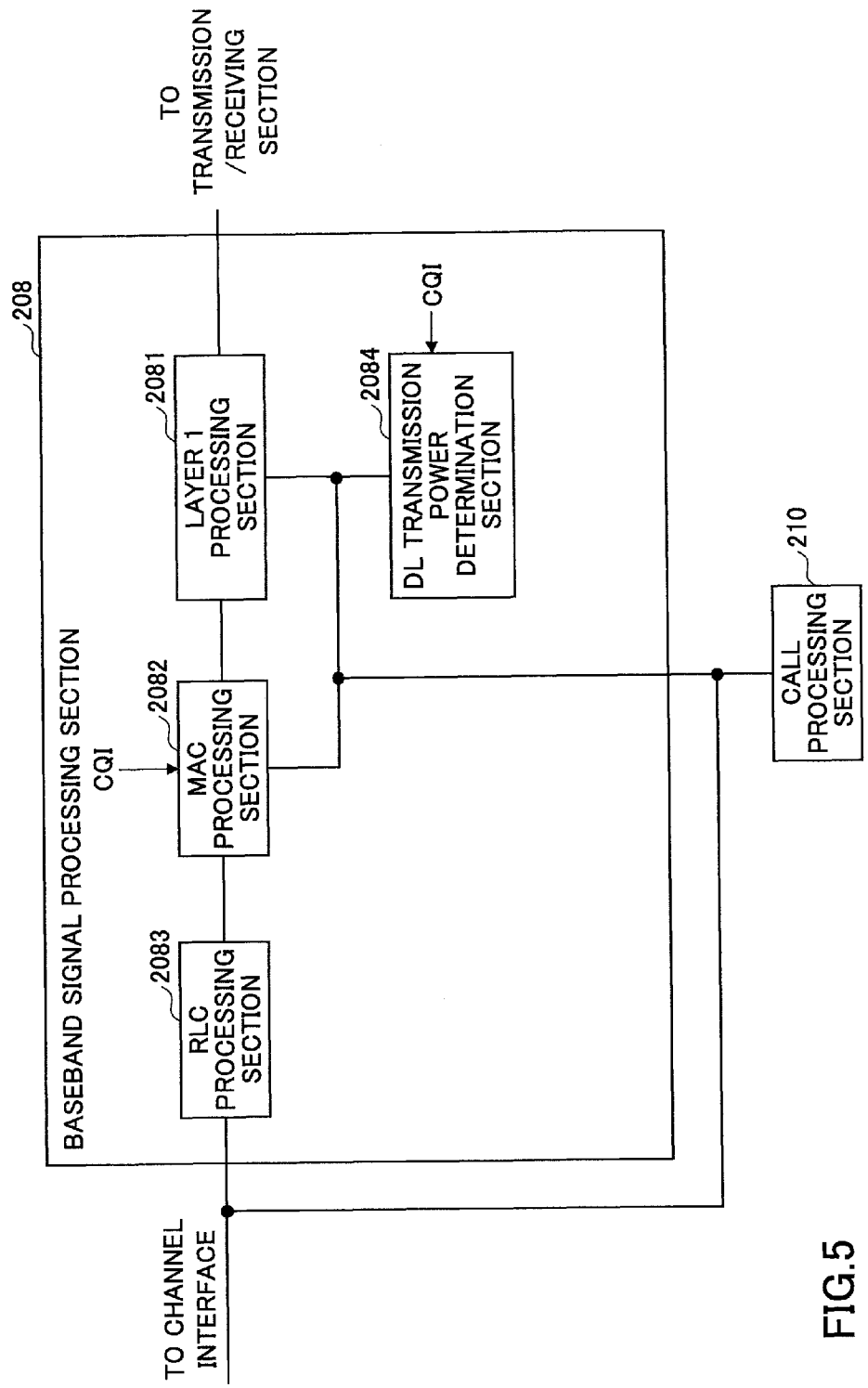
FIG. 5 is a block diagram showing a baseband signal processing section of the base station apparatus according to the embodiment of the present invention.

As shown in FIG. 5, the baseband signal processing section 208 includes a layer 1 processing section 2081, an MAC processing section 2082 as a selection unit, an RLC processing section 2083, and a DL transmission power determination section 2084 as a transmission power control unit.

As shown in FIG. 5, the layer 1 processing section 2081, the MAC processing section 2082, the RLC processing section 2083, and the DL transmission power determination section 2084, and the call processing section 210 are connected with each other.

The layer 1 processing section 2081 performs a channel coding process of the data to be transmitted in downlink, the IFFT process, a channel decoding process of the data transmitted in uplink, the IDFT process, the FFT process and the like. From the MAC processing section 2082, the layer 1 processing section 2081 receives an ID (Identification information) of a user equipment (UE) terminal communicating using the Physical Downlink Shared Channel (PDSCH); the transport format information of the user data, namely the Downlink Scheduling Information and an ID of a user equipment (UE) terminal communicating using the Physical Uplink Shared Channel (PUSCH); and the transport format information of the user data, namely the Uplink Scheduling Grant. Further, the layer 1 processing section 2081 performs transmission processes such as a channel coding process and an IFFT process and the like on the ID of the user equipment (UE) terminal communicating using the Physical Downlink Shared Channel (PDSCH) and the transport format information of the user data, namely the Downlink Scheduling Information; the ID of the user equipment (UE) terminal communicating using the Physical Uplink Shared Channel (PUSCH) and the transport format information of the user data, namely the Uplink Scheduling Grant. The ID of the user equipment (UE) terminal communicating using the Physical Downlink Shared Channel (PDSCH) and the transport format information of the user data, namely the Downlink Scheduling Information and the ID of the user equipment (UE) terminal communicating using the Physical Uplink Shared Channel (PUSCH) and the transport format information of the user data, namely the Uplink Scheduling Grant are mapped to the Physical Downlink Control Channel (PDCCH) which is the control channel in downlink.

Based on the transmission power information reported from the DL transmission power determination section 2084, the layer 1 processing section 2081 sets the transmission power of sub-carriers to which the Downlink Reference Signal (DL RS), the Physical Downlink Control Channel (PDCCH), the user data, the Synchronization Channel (SCH), the Broadcast Channel (BCH), the data signal in Persistent Scheduling and the like are mapped.

Further, the layer 1 processing section 2081 decodes the CQI included in the uplink baseband signal transmitted from the user equipment (UE) 100$_n$ and reports the decoded CQI to the MAC processing section 2082 and the DL transmission power determination section 2084.

The MAC processing section 2082 performs the MAC retransmission control of downlink user data such as the HARQ transmission process, the scheduling process, the transmission format selection process, a frequency resource allocation process and the like. Herein, the term scheduling refers to a process of selecting (sorting) the user equipment (UE) terminals to communicate using the Shared Channel in the sub-frames. As the algorithm for the process, there are the round robin, the Proportional Fairness, and the MAX C/I. In the Proportional Fairness and the Max C/I, for example, an evaluation metric of each user equipment terminal is calculated, and a process is performed in which a user equipment (UE) terminal having a larger evaluation metric is selected as the user equipment (UE) terminal to communicate by using a Shared Channel in the sub-frames. Herein, the evaluation metric corresponds to a priority level indicating a priority order of allocating the radio resources. In other words, in the Proportional Fairness and the Max C/I, in accordance with the priority level indicating the priority order of allocating the radio resources, the user equipment (UE) terminal to which the radio resources are allocated is determined. Further, the term transmission format selection refers to the determination of the information (data) of the transport format such as a modulation scheme, a coding rate, and data size related to the downlink shared channel transmitted to the user equipment (UE) 100$_n$ selected in the scheduling process. The modulation scheme, the coding rate, and the data size may be determined based on, for example, the CQI reported from the user equipment (UE) 100$_n$ in uplink. Further, the term frequency resource allocation (process) refers to a process of determining resource blocks to be used for the transmission of the downlink shared channel transmitted to the user equipment (UE) 100$_n$ selected in the scheduling process. The resource blocks may be determined based on, for example, the CQI reported from the user equipment (UE) 100$_n$ in uplink. The CQI is reported from the layer 1 processing section 2081. Further, the MAC processing section 2082 reports the ID of the user equipment terminal communicating the Physical Downlink Shared Channel (PDSH) and the transport format information of the user data, namely the Downlink Scheduling Information, to the layer 1 processing section 2081 and the DL transmission power determination section 2084. Herein, the ID of the user equipment terminal and the transport format information of the user data is determined by the scheduling process, the transmission format selection process, and the frequency resource allocation process.

Further, the MAC processing section 2082 performs a receiving process of the MAC retransmission control of uplink user data, the scheduling process, the transmission format selection process, the frequency resource allocation process and the like. Herein, the term scheduling process refers to a process of selecting a user equipment terminal to transmit the user data using the Shared Channel in predetermined sub-frames. Further, the term transmission format selection process refers to a process of determining the transport format data such as the modulation scheme, the coding rate, and the data size of the user data transmitted by the user equipment (UE) 100$_n$ selected in the scheduling process. The modulation scheme, the coding rate, and the data size may be determined based on, for example, an SIR (Signal-to-Interference Ratio) or a path loss of a sounding reference signal transmitted in uplink from the user equipment (UE). The path loss may be estimated based on, for example, the received power of the sounding reference signal and information of uplink transmission power reported from the user equipment (UE) 100$_n$ such as UE Power Headroom. Further, the term frequency resource allocation process refers to a process of determining resource blocks to be used for the transmission of the user data transmitted by the user equipment (UE) 100$_n$ selected in the scheduling process. The resource blocks may be determined based on, for example, the SIR of the sounding reference signal transmitted in uplink from the user equipment (UE). Further, the MAC processing section 2082 reports the ID of the user equipment terminal communicating using the Physical Uplink Shared Channel (PUSCH) and the transport format information of the user data, namely the Uplink Scheduling Grant, to the layer 1 processing section 2081 and the DL transmission power determination section 2084. Herein, the ID of the user equipment terminal and the transport format information of the use data is determined by the scheduling process, the transmission format selection process, and the frequency resource allocation process.

Further, based on the transmission power information reported from the DL transmission power determination section 2084, the MAC processing section 2082 may determine the resource blocks that can be allocated to the user data (Downlink-Shared Channel (DL-SCH) as the transport channel (TrCH)). And, the MAC processing section 2082 performs the scheduling process, the transmission format selection process, and the frequency resource allocation process on the resource blocks that can be allocated to the user data.

For example, the MAC processing section 2082 receives a transmission power $P_{BCH}$ of the Broadcast Channel (BCH) in the sub-frame, a transmission power $P_{SCH}$ of the Synchronization Channel (SCH) in the sub-frame, a transmission power $P_{data,TPC}$ of the data signal in Persistent Scheduling, a transmission power $P_{data}^{(unit)}$ per one sub-carrier of the user data (Downlink-Shared Channel (DL-SCH) as the transport channel (TrCH)) in the sub-frame, and the maximum transmission power $P_{total}$ of the base station apparatus 200 from the DL transmission power determination section 2084 as transmission power information. Then, the number of resource blocks $Num_{RB}^{(data)}$ that can be allocated to the user data (Downlink-Shared Channel (DL-SCH) as the transport channel (TrCH)) may be calculated based on $P_{BCH}$, $P_{SCH}$, $P_{data,TPC}$, $P_{data}^{(unit)}$, and $P_{total}$.

The RLC processing section 2083 performs segmentation and concatenation of downlink packet data, a transmission process of the RLC layer (data) such as a transmission process of the RLC retransmission control, segmentation and concatenation of uplink packet data, and a receiving process of the RLC layer (data) such as a receiving process of the RLC retransmission control. Further, the RLC processing section 2083 may perform transmission/receiving processes of downlink and uplink PDCP layer (data).

The DL transmission power determination section 2084 determines the transmission power of the Downlink Reference Signal (DL RS), the Physical Downlink Control Channel (PDCCH), the user data, the Synchronization Channel (SCH), the Broadcast Channel (BCH), the data signal in Persistent Scheduling and the like and reports the determined transmission power of the Downlink Reference Signal (DL RS), the Physical Downlink Control Channel (PDCCH), the user data, the Synchronization Channel (SCH), the Broadcast Channel (BCH), the data signal in Persistent Scheduling and the like to the layer 1 processing section 2081 and the MAC processing section 2082 as the transmission power information. Herein, the values of the transmission power of the Downlink Reference Signal (DL RS), the Synchronization Channel (SCH), and the Broadcast Channel (BCH) are generally fixed values and determined by referring to a value reported through signaling from an upper layer or a value set as an internal parameter in the base station apparatus 200. Further, the transmission power of the data signal in Persistent Scheduling may be determined based on, for example, a CQI value reported from the user equipment (UE) terminal. Further, as the transmission power per one sub-carrier of the user data (Downlink-Shared Channel (DL-SCH) as the transport channel (TrCH)), namely, as the transmission power per one sub-carrier of the Physical Downlink Shared Channel (PDSCH), for example, the transmission power per one sub-carrier may be used, assuming that the transmission power is equally allocated to all the sub-carriers across the system bandwidth.

A process of determining the transmission power to be allocated to the Physical Downlink Control Channel (PDCCH) performed by the DL transmission power determination section 2084 is described below. The Physical Downlink Control Channel (PDCCH) may also be called a Downlink L1/L2 Control Channel (DL L1/L2 Control Channel).

Next, the Transmission Power Control (TPC) of the Downlink Reference Signal (DL RS) is described. The transmission power of the Downlink Reference Signal (DL RS) may be set in advance through an external input interface (IF). Herein, a transmission power per one resource element of the Downlink Reference Signal (DL RS) is defined as $P_{DLRS}$ and the number of the resource elements of the Downlink Reference Signal (DL RS) in the first OFDM symbol(s) in the sub-frame is defined as $n_{DLRS}$.

Herein, the term to be set through the external input interface (IF) refers to being set by a fixed value as a parameter, and a value of the parameter may be stored as an internal parameter of the base station apparatus 200, or may be remotely specified from a node in the core network 400 or the access gateway 300.

Next, the Transmission Power Control (TPC) of the Broadcast Channel (BCH) is described. The transmission power of the Broadcast Channel (BCH) may be set in advance through an external input interface (IF), namely, as described above, a fixed value is set as the transmission power of the Broadcast Channel (BCH).

Next, the Transmission Power Control (TPC) of the Paging Channel (PCH) is described. It is assumed that the transmission power of the Paging Channel (PCH) is the same as that of the Physical Downlink Shared Channel (PDSCH). In other words, as the transmission power of the Paging Channel (PCH), a value of the transmission power per one sub-carrier is set assuming that the transmission power is equally allocated to all the sub-carriers across the system bandwidth. Therefore, as described above, a fixed value is set as the transmission power of the Paging Channel (PCH).

Next, the Transmission Power Control (TPC) of a Synchronization Channel (SCH), namely, the Transmission Power Control (TPC) of a Primary-Synchronization Channel (P-SCH) and a Secondary-Synchronization Channel (S-SCH) are described. The transmission power of the Synchronization Channel (SCH) may be set through an external input interface (IF), namely, as described above, a fixed value is set as the transmission power of the Synchronization Channel (SCH).

Next, the Transmission Power Control (TPC) of a Random Access Channel Response (RACH response) is described. The Random Access Channel Response (RACH response) corresponds to message 2 in a random access procedure. It is assumed that the transmission power of the Random Access Channel Response (RACH response) is the same as that of the Physical Downlink Shared Channel (PDSCH). In other words, as the transmission power of the Random Access Channel Response (RACH response), a value of the transmission power per one sub-carrier is set assuming that the transmission power is equally allocated to all the sub-carriers across the system bandwidth. Therefore, as described above, a fixed value is set as the transmission power of the Random Access Channel Response (RACH response).

In the above process, it is assumed that the transmission power per one sub-carrier of the Paging Channel (PCH) and the transmission power per one sub-carrier of the Random Access Channel Response (RACH response) are the same as that of the Physical Downlink Shared Channel (PDSCH). However, the transmission power per one sub-carrier of the Paging Channel (PCH) and the transmission power per one sub-carrier of the Random Access Channel Response (RACH response) may be set through the external input interface (IF) like the Synchronization Channel (SCH) or the Broadcast Channel (BCH).

Next, the Transmission Power Control (TPC) of the Physical Downlink Control Channel (PDCCH) is described. In the following, a symbol m (m: an integer) is used as an index of the OFDM symbols. More specifically, the values of m (0, 1, 2, . . . ) are sequentially defined to denote the OFDM symbols arranged from the header (left-hand edge of FIG. 2) of one sub-frame. Further, the symbol M denotes the number of OFDM symbols allocated to the Physical Downlink Control Channel (PDCCH).

Information items such as the Downlink L1/L2 Control Channel Format Indicator (DL L1/L2 Control Channel Format Indicator which is also called Category 0 Information), the Downlink Scheduling Information (DL Scheduling Information), the Acknowledgement Information (UL ACK/ NACK), the Uplink Scheduling Grant, the Overload Indicator, the Transmission Power Control Command Bit (TPC bit) and the like are mapped to the Physical Downlink Control Channel (PDCCH).

The Downlink L1/L2 Control Channel Format Indicator is the information designating the number of OFDM symbols allocated to the Physical Downlink Control Channel (PDCCH) (i.e., a value of the symbol M as described above). The number of OFDM symbols allocated to the Physical Downlink Control Channel (PDCCH) (i.e., a value of the symbol M as described above) depends on the number of simultaneously multiplexed users and received quality of the multiplexed users. Typically, a sufficiently large number is to be set as the number of OFDM symbols allocated to the Physical Downlink Control Channel (PDCCH). However, when the number of simultaneously multiplexed users is small, the number of OFDM symbols allocated to the Physical Downlink Control Channel (PDCCH) decreases. Therefore, if the number of simultaneously multiplexed users and the received quality of the multiplexed users differ among the sub-frames, the Physical Downlink Control Channel (PDCCH) having sufficiently large bandwidth may not be effectively used.

To reduce (overcome) such an inefficient use of the Physical Downlink Control Channel (PDCCH), the number of OFDM symbols allocated to the Physical Downlink Control Channel (PDCCH) (i.e., the value of the symbol M as described above) is reported by using the Downlink L1/L2 Control Channel Format Indicator mapped to the Physical Downlink Control Channel (PDCCH). In other words, the number of OFDM symbols allocated to the Physical Downlink Control Channel (PDCCH) (i.e., the value of the symbol M as described above) is adequately set with respect to each sub-frame.

In the following, a transmission power control method of each information item in the Physical Downlink Control Channel (PDCCH) and a determination method of the number of OFDM symbols allocated to the Physical Downlink Control Channel (PDCCH) (i.e., the value of the symbol M as described above) are described.

Upon determining the transmission power of the Physical Downlink Control Channel (PDCCH), the DL transmission power determination section 2084 determines the transmission power of the Downlink L1/L2 Control Channel Format Indicator, the transmission power of the Overload Indicator, the transmission power of the Acknowledgement Information (UL ACK/NACK), and the transmission power of the Transmission Power Control Command Bit (TPC bit). Further, the DL transmission power determination section 2084 determines the transmission power of the Downlink Scheduling Information (DL Scheduling Information) and the transmission power of the Uplink Scheduling Grant, and further determines the number of OFDM symbols allocated to the Physical Downlink Control Channel (PDCCH) (i.e., the value of the symbol M as described above).

It is not always necessary to map all signals described above to the Physical Downlink Control Channel (PDCCH). For example, among the signals described above, the Overload Indicator may not be transmitted and the rest of the signals, i.e., the Downlink L1/L2 Control Channel Format Indicator, the Acknowledgement Information (UL ACK/ NACK), the Transmission Power Control Command Bit (TPC bit), the Downlink Scheduling Information (DL Scheduling Information), and the Uplink Scheduling Grant may be transmitted via the Physical Downlink Control Channel (PDCCH).

Next, the definitions of the terms described below are as follows:

TABLE 1

| PARAMETER | UNIT | DEFINITION | REMARK |
|---|---|---|---|
| $P_{max}$ | W | Maximum transmission power of (rated power) of base station apparatus 200 | For TPC bit #k |
| $CQI_{average,ULACK}^{(l)}$ | dB | CQI value related to the entire downlink system bandwidth of the user equipment which is the transmission target of the UL ACK/NACK | This CQI value is reported from layer 1 processing section 2081. Index l corresponds one-to-one to the number of UL-SCH transmitted by the user equipment. |
| $CQI_{average,TPC}^{(k)}$ | dB | CQI value related to the entire downlink system bandwidth of the user equipment which is the transmission target of the TPC bit | This CQI value is reported from layer 1 processing section 2081. Index k corresponds to index of TPC bit. |
| $CQI_{average,DL}^{(k\_dl)}$ | dB | CQI value related to the entire downlink system bandwidth and reported from user equipment #k_dl which is the transmission target of the Downlink Scheduling Information | This CQI value is reported from layer 1 processing section 2081. |
| $CQI_{average,UL}^{(k\_ul)}$ | dB | CQI value related to the entire downlink system bandwidth and reported from the user equipment #k_ul which is the transmission target of Uplink Scheduling Grant | This CQI value is reported from layer 1 processing section 2081. |
| $CQI_{average}^{(min)}$ | dB | Reference CQI for the transmission power control of UL ACK/NACK, TPC bit, Downlink Scheduling Information, and Uplink Scheduling Grant. | This value is set through the external input interface (IF). |

TABLE 1-continued

| PARAMETER | UNIT | DEFINITION | REMARK |
|---|---|---|---|
| $M$ | UNIT | The number of OFDM symbols used for Physical Downlink Control Channel. | This value is calculated in an embodiment of the present invention |
| $P_{cat0}$ | W | Transmission power (absolute value) per one resource element of Downlink L1/L2 Control Channel Format Indicator | This value is calculated in an embodiment of the present invention |
| $n_{cat0}$ | UNIT | The number of resource elements of Downlink L1/L2 Control Channel Format Indicator | |
| $P_{OLI}^{(IF)}$ | W | Transmission power (absolute value) per one resource element of Overload Indicator assuming that the number M of OFDM symbols used for Physical Downlink Control Channel is 1. | This value is set through the external input interface (IF). |
| $n_{OLI}$ | UNIT | The number of resource elements per one OFDM symbol of Overload Indicator. | |
| $P_{ACK}^{(max)}$ | W | Transmission power (absolute value) per one resource element of UL ACK/NACK when CQI is reference CQI (CQIaverage(min)) assuming that the number M of OFDM symbols used for Physical Downlink Control Channel is 1. | This value is set through the external input interface (IF). |

TABLE 2

| PARAMETER | UNIT | DEFINITION | REMARK |
|---|---|---|---|
| $P_{ACK}^{(min)}$ | W | The minimum value (absolute value) of the Transmission power per one resource element of UL ACK/NACK assuming that the number M of OFDM symbols used for Physical Downlink Control Channel is 1. | This value is set through the external input interface (IF). |
| $n_{ACK}$ | UNIT | The number of resource elements per one OFDM symbol per one user equipment of UL ACK/NACK | |
| $L_{ACK}$ | UNIT | The number of UL ACK/NACK transmitted to the sub-frame | This number corresponds to the number of user equipment transmitting UL-SCH in the sub-frame where the UL-SCH corresponding to the UL ACK/NACK is transmitted. Namely this number corresponds to the multiplexing number of UL-SCH. |
| $P_{TPC}^{(max)}$ | W | Transmission power (absolute value) per one resource element of TPC bits when CQI is reference CQI (CQIaverage(min)) assuming that the number M of OFDM symbols used for Physical Downlink Control Channel is 1. | This value is set through the external input interface (IF). |
| $P_{TPC}^{(min)}$ | W | The minimum value (absolute value) of the Transmission power per one resource element of TPC bits assuming that the number M of OFDM symbols used for Physical Downlink Control Channel is 1. | This value is set through the external input interface (IF). |
| $n_{TPC}$ | UNIT | The number of resource elements per one OFDM symbol per one user equipment terminal of TCP bit | |
| $K_{TPC}$ | UNIT | The number of TPC bits transmitted to the sub-frame. | It is assumed this number corresponds to the number of TCP bit actually transmitted. |
| $P_{DL\text{-}L1L2}^{(maxi,)}$ | W | Transmission power (absolute value) per one resource element of Downlink Scheduling Information when CQI is reference CQI (CQIaverage(min)) and ith MCS is used. | This value is set through the external input interface (IF). |
| $P_{DL\text{-}L1L2}^{(min)}$ | W | The minimum value (absolute value) of the Transmission power per one resource element of Downlink Scheduling Information | This value is set through the external input interface (IF). |
| $n_{DL\text{-}L1L2}^{(i,m)}$ | Resource element | The number of resource elements per one user equipment of the Downlink Scheduling Information in the mth OFDM symbol when ith MCS is used. | |
| $MCS_{DL\text{-}L1L2}^{(k)}$ | index | MCS number used for Downlink Scheduling Information of the user equipment having the number of k (k = 1, 2, . . . , KDL-L1L2(max) | |

TABLE 3

| PARAMETER | UNIT | DEFINITION | REMARK |
|---|---|---|---|
| $P_{UL\text{-}L1L2}^{(maxi,)}$ | W | Transmission power (absolute value) per one resource element of Uplink Scheduling Grant when CQI is reference CQI (CQIaverage(min)) and ith MCS is used. | This value is set through the external input interface (IF). |
| $P_{UL\text{-}L1L2}^{(min)}$ | W | The minimum value (absolute value) of the Transmission power per one resource element of Uplink Scheduling Grant | This value is set through the external input interface (IF). |

TABLE 3-continued

| PARAMETER | UNIT | DEFINITION | REMARK |
|---|---|---|---|
| $n_{UL\text{-}L1L2}^{(i,m)}$ | Resource element | The number of resource elements per one user equipment of the Uplink Scheduling Grant in the mth OFDM symbol when ith MCS is used. | |
| $P_{L1L2,RACHres}$ | W | Transmission power (absolute value) per one resource element of the Downlink Scheduling Information when user equipment #k_dl transmits RACH response. | This value is set through the external input interface (IF). |
| $P_{L1L2,PICH}$ | W | Transmission power (absolute value) per one resource element of the Downlink Scheduling Information when user equipment #k_dl transmits PCH. | This value is set through the external input interface (IF). |
| $P_{L1L2, RACHmessage3}$ | W | Transmission power (absolute value) per one resource element of the Uplink Scheduling Grant when user equipment #k_dl transmits message 3 in random access procedure | This value is set through the external input interface (IF). |

The transmission power of the Downlink L1/L2 Control Channel Format Indicator is set through the external input interface (IF). The transmission power (absolute value) per one resource element of the Downlink L1/L2 Control Channel Format Indicator is defined as $P_{cat0}$. Further, the number of the resource elements of the Downlink L1/L2 Control Channel Format Indicator is defined as $n_{cat0}$.

The transmission power of the Overload Indicator is set through the external input interface (IF) as the transmission power when assuming that the number of OFDM symbols allocated to the Physical Downlink Control Channel (PDCCH) is one (1) (M=1). The transmission power (absolute value) per one resource element of the Overload Indicator is defined as $P_{OLI}$, which is calculated as shown in formula 1. Here, the number of the resource elements per one OFDM symbol of the Overload Indicator is defined as $n_{OLI}$ and the transmission power (absolute value) of the Overload Indicator set through the external input interface (IF) is defined as $P_{OLI}^{(IF)}$.

$$P_{OLI} = P_{OLI}^{(IF)}/M \quad (1)$$

Next, the reason why $P_{OLI}^{(IF)}$ is divided by M in formula (1) is described. A value of $P_{OLI}^{(IF)}$ is defined based on the assumption that M=1; therefore, for example, in a case where M=2, the Overload Indicator is mapped to both OFDM symbols where m=0 and m=1. In this case, to maintain the total transmission power of the Overload Indicator in the sub-frame, the transmission power in each sub-carrier in each OFDM symbol, namely the transmission power per one resource element, is obtained by dividing the $P_{OLI}^{(IF)}$ by two (2). This method also applies to a case where M=3.

Next, the transmission power of the Acknowledgement Information (UL ACK/NACK) is described. The transmission power of the Acknowledgement Information (UL ACK/NACK) is calculated based on the CQI value ($CQI_{average,ULACK}^{(l)}$) for the entire downlink system bandwidth, i.e. the wideband CQI value, reported from the user equipment (UE) terminal which is the transmission source of the Acknowledgement Information (UL ACK/NACK). The CQI value ($CQI_{average,ULACK}^{(l)}$) for the entire downlink system bandwidth, i.e. the wideband CQI value, is included in the CQI information reported from the layer 1 processing section 2081. The transmission power $P_{ACK,tmp}^{(l)}$ (absolute value, unit: W) per one resource element of the Acknowledgement Information (UL ACK/NACK) assuming that the number of OFDM symbols allocated to the Physical Downlink Control Channel (PDCCH) is one (1) (i.e., M=1), is calculated in accordance with formula (2) described below. Here, an index 1 is an index corresponding one-to-one to the number of (resource elements of) an Uplink-Shared Channel (UL-SCH). The corresponding relationship between the number of the (resource elements of) Acknowledgement Information (UL ACK/NACK) and the number of (resource elements of) the Uplink-Shared Channel (UL-SCH) is described in, for example, Non Patent Document 4.

$$P_{ACK,tmp}^{(l)} = \text{Max}\{P_{ACK}^{(max)} \cdot 10^{(CQI_{average}^{(min)} - CQI_{average,ULACK}^{(l)})/10}, P_{ACK}^{(min)}\} \quad (2)$$

In formula (2), a symbol $P_{ACK}^{(max)}$ denotes the transmission power (absolute value) per one resource element of the Acknowledgement Information (UL ACK/NACK) when the CQI value is $CQI_{average}^{(min)}$ and a symbol $P_{ACK}^{(min)}$ denotes the minimum value (absolute value) of the transmission power per one resource element of the Acknowledgement Information (UL ACK/NACK). Each of $P_{ACK}^{(max)}$, $CQI_{average}^{(min)}$ and $P_{ACK}^{(min)}$ is set through the external input interface (IF).

Further, the number of resource elements per one OFDM symbol of the Acknowledgement Information (UL ACK/NACK) is defined as $n_{ACK}$ and the number of (resource elements of) the Acknowledgement Information (UL ACK/NACK) actually transmitted in the sub-frame is defined as $L_{ACK}$. The number of (resource elements of) the Acknowledgement Information (UL ACK/NACK) $L_{ACK}$ corresponds to the number of user equipment (UE) terminals to transmit the Uplink-Shared Channel (UL-SCH) in the sub-frame where the Uplink-Shared Channel (UL-SCH) corresponding to the Acknowledgement Information (UL ACK/NACK) is transmitted, namely the multiplexing number of the Uplink-Shared Channel (UL-SCH). The transmission power $P_{ACK}^{(l)}$ (absolute value, unit: W) per one resource element of the Acknowledgement Information (UL ACK/NACK) is finally calculated in accordance with the following formula (3).

$$P_{ACK}^{(l)} = P_{ACK,tmp}^{(l)}/M \quad (3)$$

The reason why $P_{ACK,tmp}^{(l)}$ is divided by M in formula (3) is the same as that described for formula (1).

Next, the transmission power of the Transmission Power Control Command Bit (TPC bit) is described. The transmission power of the Transmission Power Control Command Bit (TPC bit) is calculated based on the CQI value for the entire downlink system bandwidth ($CQI_{average,TPC}^{(k)}$), i.e. the wideband CQI value, reported from the user equipment (UE) terminal which is the transmission source of the Transmission Power Control Command Bit (TPC bit). The CQI value ($CQI_{average,ULACK}^{(k)}$) related to the entire downlink system bandwidth, i.e. the wideband CQI value, is included in the CQI information reported from the layer 1 processing section 2081. The transmission power $P_{TPC,tmp}^{(k)}$ (absolute value, unit: W) per one resource element of the Transmission Power Control Command Bit (TPC bit), assuming that the number of OFDM symbols allocated to the Physical Downlink Control Channel (PDCCH) is one (1) (i.e., M=1), is calculated in accordance with formula (4) below. Here, an index k denotes an Index of the Transmission Power Control Command Bit (TPC bit) (or a number corresponds one-to-one to a number of an uplink sounding reference signal in a sub-frame which is $N_{TPC}$ (sub-frame(s)) before the sub-frame).

$$P_{TPC,tmp}^{(k)} = \text{Max}\left\{P_{TPC}^{(max)} \cdot 10^{(CQI_{average}^{(min)} - CQI_{average,TPC}^{(k)})/10}, P_{TPC}^{(min)}\right\} \quad (4)$$

In formula (4), the symbol $P_{TPC}^{(max)}$ denotes a transmission power (absolute value) per one resource element of the Transmission Power Control Command Bit (TPC bit) when the value of CQI is a predetermined value $CQI_{average}^{(min)}$ and the symbol $P_{TPC}^{(min)}$ denotes the minimum value (absolute value) of the transmission power per one resource element of the Transmission Power Control Command Bit (TPC bit). Each of $P_{TPC}^{(max)}$, $CQI_{average}^{(min)}$, and $P_{TPC}^{(min)}$ is set through the external input interface (IF).

Further, the number of resource elements per one OFDM symbol of the Transmission Power Control Command Bit (TPC bit) is defined as $n_{TPC}$ and the number of the Transmission Power Control Command Bit (TPC bit) actually transmitted in the sub-frame is defined as $K_{TPC}$.

The transmission power $P_{PCT}^{(k)}$ (absolute value, unit: W) per one resource element of the Transmission Power Control Command Bit (TPC bit) is finally calculated in accordance with the following formula (5).

$$P_{TPC}^{(k)} = P_{TPC,tmp}^{(k)}/M \quad (5)$$

The reason why $P_{TPC,tmp}^{(k)}$ is divided by M in formula (5) is the same as that described for formula (1).

Next, the DL transmission power determination section 2084 determines the transmission power of the Downlink Scheduling Information (DL Scheduling Information) and the transmission power of the Uplink Scheduling Grant.

The number M of OFDM symbols allocated to the Physical Downlink Control Channel (PDCCH) is calculated as described below based on the CQI value related to the entire system bandwidth, i.e. the wideband CQI value, of "the user equipment (UE) terminal selected as the user equipment (UE) terminal communicating using a shared channel in the sub-frame" in the scheduling of the downlink user data (Downlink-Shared Channel (DL-SCH) as the transport channel (TrCH)) and the uplink user data (Uplink-Shared Channel (UL-SCH) as the transport channel (TrCH)) in the MAC processing section 2082.

The number of "the user equipment (UE) terminals selected as the user equipment (UE) terminals communicating using the shared channel in the sub-frame" related to downlink user data (Downlink-Shared Channel (DL-SCH) as the transport channel (TrCH)) is defined as K_DL, and the numbers of the user equipment (UE) terminals are expressed as k_dl (k_dl=0, 1, . . . , K_DL=1 The number of "the user equipment (UE) terminals selected as the user equipment (UE) terminals communicating using a shared channel in the sub-frame" related to uplink user data (Uplink-Shared Channel (UL-SCH) as the transport channel (TrCH)) is defined as K_UL, and the numbers of the user equipment (UE) terminals are expressed as k_ul (k_dl=0, 1, . . . , K_UL−1).

The number of blocks for the control channel related to the Downlink Scheduling Information of the user equipment terminal #k_dl is defined as $N_{k\_dl}$, and the number of blocks for the control channel related to the Uplink Scheduling Grant of the user equipment terminal #k_ul is defined as $N_{k\_ul}$. Here, the block for the control channel refers to a group of resource elements and is a unit of resources to be allocated to the Downlink Scheduling Information and the Uplink Scheduling Grant. The block for the control channel may also be called a Control Channel Element (CCE). Otherwise, a Mini CCE obtained by further dividing the Control Channel Element (CCE) may be defined as the block for the control channel. For example, the Mini CCE may be composed of four resource elements.

Adaptive Modulation and Coding (AMC) may be applied to the Downlink Scheduling Information and the Uplink Scheduling Grant. For example, two (2) Modulation and Coding Schemes (MCSs) are applied to the Downlink Scheduling Information and the Uplink Scheduling Grant, so that one (1) block for the control channel is allocated to the first MCS (hereinafter may be referred to as MCS No. 0) and two (2) blocks for the control channel are allocated to the second MCS (hereinafter may be referred to as MCS No. 1). The number of the Modulation and Coding Schemes (MCSs) is not limited to two (2), and three (3) or more Modulation and Coding Schemes (MCSs) may be applied.

Next, the block for the control channel is described with reference to FIGS. 6 and 7.

Figure 6:
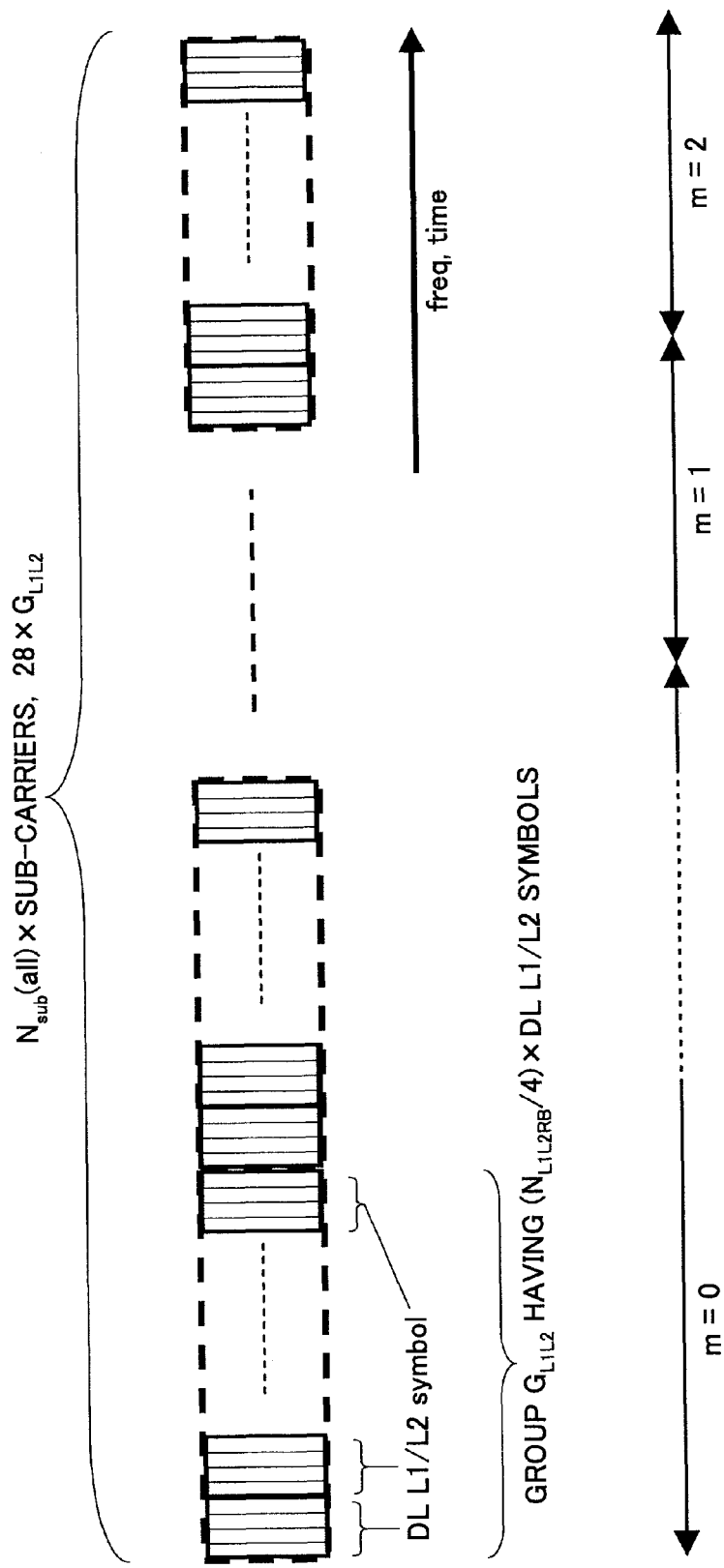
FIG. 6 is a drawing showing a relationship between downlink L1/L2 symbols and a group ($G_{L1L2}$) of the symbols.

As shown in FIG. 6, the sub-carriers to be allocated to the Downlink Scheduling Information and the Uplink Scheduling Grant are arranged in a line from the sub-carrier having the smallest frequency of the first OFDM symbols (as a result, $N_{sub}$(all) sub-carriers are arranged). Namely, two-dimensional resource elements in the frequency direction (sub-carrier) and in the time direction (OFDM symbols m=0, 1, 2) are arranged in one dimension. Then, a group of four (4) sub-carriers is defined as one DL L1/L2 symbol, and a group of $N_{L1L2RB}/4$ units of DL L1/L2 symbols is defined as $G_{L1L2}$. In this case, it is assumed that there exist $N_G$ units of $G_{L1L2}$. In the descriptions, it is assumed that $N_{L1L2RB}$=12 and $N_G$=28.

Figure 7:
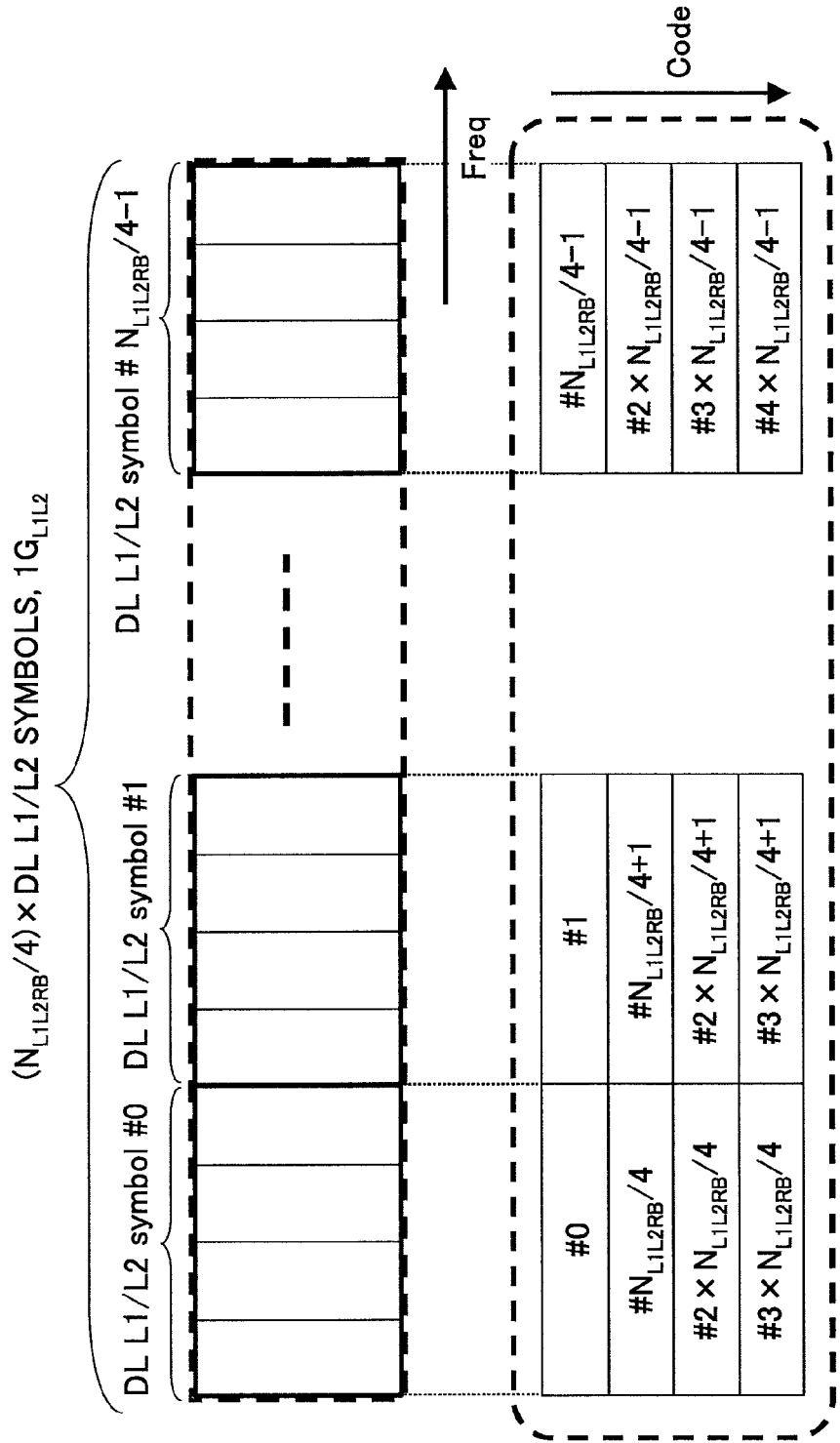
FIG. 7 is a drawing showing blocks for control channels and the numbers of the blocks for control channels.

Next, as shown in FIG. 7, one DL L1/L2 symbol is spread by Walsh code having spreading factor 4, so that one code resource in one DL L1/L2 symbol is allocated to one block for the control channel. In the same manner, the resources are allocated in each $G_{L1L2}$; therefore, the resources corresponding to twenty-eight (28) resource elements are allocated to one block for the control channel. As shown in FIG. 7, the numbers of the blocks for the control channel are allocated in ascending order in frequency direction first and then allocated in ascending order in code direction.

In this case, for example, when the MCS No. 0 (i.e., the first MCS) is used, one block for the control channel is used, and when the MCS No. 1 (i.e., the second MCS) is used, two blocks for the control channel are used. The MCS is separately set with respect to each user equipment (UE) terminal. The MCS No. is set by RRC (Radio Resource Control) message. When QPSK modulation is applied, two (2) bits are mapped to one resource element. Therefore, in a case of MCS No. 0, the number of encoded bits is 56 (28×2 [Bits/Resource element]=56 bits); and in a case of MCS No. 1, the number of encoded bits is 112 (28×2 [blocks for the control channel]×2 [Bits/Resource element]=112 bits).

In the above-described definition of the block for the control channel, the Downlink Scheduling Information and the Uplink Scheduling Grant are multiplexed with the Physical Downlink Control Channel (PDCCH) using a combined multiplexing scheme of a code division multiplexing scheme and a frequency division multiplexing scheme. However, the transmission power control method described below may also be applied when the Downlink Scheduling Information and the Uplink Scheduling Grant are multiplexed with the Physical Downlink Control Channel (PDCCH) using the frequency division multiplexing scheme. Further, the transmission power control method described below may also be applied even when the Downlink Scheduling Information and the Uplink Scheduling Grant are multiplexed with the Physical Downlink Control Channel (PDCCH) using the code division multiplexing scheme.

Further, a control method of the present invention may also be applied when the block for the control channel is defined as a combination of resources not described above.

The transmission power of the Downlink Scheduling Information of the user equipment (UE) terminal #k_dl is defined as $P_{DL-L1L2,tmp}^{(k\_dl)}$. Further, when an $i^{th}$ MCS is used, the number of the resource elements per one user equipment (UE) terminal for the Downlink Scheduling Information is defined as $n_{DL-L1L2,tmp}^{(i)}$. Further, the transmission power of the Uplink Scheduling Grant of the user equipment (UE) terminal #k_ul is defined as $P_{UL-L1L2,tmp}^{(k\_ul)}$. Further, when the $i^{th}$ MCS is used, the number of the resource elements per one user equipment (UE) terminal for the Uplink Scheduling Grant is defined as $n_{UL-L1L2,tmp}^{(i)}$.

By the following determination formula, a value of M is determined.
(Start of Determination Formula)

First, a value of $N_{all}$ is calculated using formula (6). In formula (6), a total of a sum of the numbers of the resource elements used for each Downlink Scheduling Information to be transmitted in the sub-frame and a sum of the numbers of the resource elements used for each Uplink Scheduling Grant to be transmitted in the sub-frame is calculated.

$$N_{all} = \sum_{k\_dl=0}^{K\_DL-1} N_{k\_dl} + \sum_{k\_ul=0}^{K\_UL-1} N_{k\_ul} \quad (6)$$

Next, in the sub-frame, a transmission power of each Downlink Scheduling Information, namely a transmission power $P_{DL-L1L2,tmp}^{(k\_dl)}$ related to the Downlink Scheduling Information of the user equipment (UE) terminal #k_dl is calculated.

When the user equipment (UE) terminal #k_dl transmits the Random Access Channel Response (RACH response), namely, when an ID of the user equipment (UE) terminal included in the Downlink Scheduling Information is an RA-RNTI (Random Access-Radio Network Temporary Identifier) of RACH preamble, a formula $P_{DL-L1L2,tmp}^{(k\_dl)} = P_{L1L2,RACHres}$ is satisfied. The $P_{L1L2,RACHres}$ is a fixed value set through the external input interface (IF).

When the user equipment (UE) terminal #k_dl transmits not the Random Access Channel Response (RACH response) but the Paging Channel (PCH), namely, when an ID of the user equipment (UE) terminal included in the Downlink Scheduling Information is an ID of the Group of the user equipment (UE) terminals designated by the Paging Indicator, the formula $P_{DL-L1L2,tmp}^{(k\_dl)} = P_{L1L2,PICH}$ is satisfied. The $P_{L1L2,PICH}$ is a fixed value set through the external input interface (IF).

In addition to the common channels of the PCH and the RACH response, the Dynamic Broadcast Channel (D-BCH) may also be transmitted. In this case, an ID designated by the user equipment (UE) terminal #k_dl corresponds to the Dynamic Broadcast Channel (D-BCH), and the formula $P_{DL-L1L2,tmp}^{(k\_dl)} = P_{L1L2,D-BCH}$ is satisfied. The $P_{L1L2,D-BCH}$ is a fixed value set through the external input interface (IF).

When the user equipment (UE) terminal #k_dl transmits neither the Random Access Channel Response (RACH response) nor the Paging Channel (PCH), formula (7) is satisfied. Namely, the transmission power $P_{DL-L1L2,tmp}^{(k\_dl)}$ related to the Downlink Scheduling Information of the user equipment (UE) terminal #k_dl is calculated based on the CQI value $CQI_{average,DL}^{(k\_dl)}$ related to the downlink system bandwidth (the wideband CQI value), the CQI value $CQI_{average,DL}^{(k\_dl)}$ being reported from the user equipment (UE) terminal #k_dl which is the transmission source of the Downlink Scheduling Information. The CQI value $CQI_{average,DL}^{(k\_dl)}$ related to the downlink system bandwidth (the wideband CQI value) is included in the CQI information reported from the layer 1 processing section 2081.

$$P_{DL-L1L2,tmp}^{(k\_dl)} = \text{Max} \quad (7)$$

$$\left\{ P_{DL-L1L2}^{\{max,MCS_{DL-L1L2}^{(k\_dl)}\}} \cdot 10^{\left(CQI_{average}^{(min)} - CQI_{average,DL}^{(k\_dl)} + \Delta_{k\_dl}^{(DL)}\right)/10}, P_{DL-L1L2}^{(min)} \right\}$$

In formula (7)

$$P_{DL-L1L2}^{\{max,MCS_{DL-L1L2}^{(k\_dl)}\}} \quad (A)$$

denotes the transmission power (absolute value) per one resource element of the Downlink Scheduling Information when the CQI is the predetermined value $CQI_{average}^{(min)}$, and $P_{DL-L1L2}^{(min)}$ denotes the minimum value (absolute value) of the transmission power per one resource element of the Downlink Scheduling Information. Further, $\Delta_{k\_dl}^{(DL)}$ denotes a fixed offset value. Each of the formula (A), $CQI_{average}^{(min)}$, $P_{DL-L1L2}^{(min)}$, and $\Delta_{k\_dl}^{(DL)}$ is set through the external input interface (IF). Further, the superscript suffix $MCS_{DL-L1L2}^{(k\_dl)}$ in the formula (A) denotes an index indicating the MCS No. of the DL scheduling Information to be transmitted to the user equipment (UE) terminal #k_dl. Namely, by defining the formula (A) with respect to each MCS, adequate transmission power control may become possible with respect to each MCS.

In formula (7), the transmission power is controlled so as not to be equal to or less than the minimum value $P_{DL-L1L2}^{(min)}$. However, the transmission power may be controlled so as not to be equal to or less than the minimum value and so as not to be equal to or greater than the maximum value at the same time as well.

Further, in the sub-frame, the transmission power of each Uplink Scheduling Grant, namely, the transmission power $P_{DL-L1L2,tmp}^{(k\_ul)}$ related to the Uplink Scheduling Grant of the user equipment (UE) terminal #k_ul is calculated.

When the user equipment (UE) terminal #k_ul transmits Message 3 of the random access procedure, the formula $P_{DL-L1L2,tmp}^{(k\_ul)} = P_{L1L2,RACHmessage3}$ is satisfied. The $P_{L1L2,RACHmessage3}$ is a fixed value set through the external input interface (IF).

On the other hand, when the user equipment (UE) terminal #k_ul does not transmit the Message 3 of the random access procedure, the formula (8) is satisfied. Namely, the transmission power $P_{UL-L1L2,tmp}^{(k\_ul)}$ related to the Uplink Scheduling Grant of the user equipment (UE) terminal #k_ul is calculated based on the CQI value $CQI_{average,UL}^{(k\_ul)}$ related to the downlink system bandwidth (the wideband CQI), the CQI value $CQI_{average,UL}^{(k\_ul)}$ being reported from the user equipment (UE) terminal #k_ul which is the transmission destination of the Uplink Scheduling Grant. The CQI value $CQI_{average,UL}^{(k\_ul)}$ related to the downlink system bandwidth (the wideband CQI) is included in the CQI information reported from the layer 1 processing section 2081.

$$P_{UL-L1L2,tmp}^{(k\_ul)} = \text{Max} \quad (8)$$

$$\left\{ P_{UL-L1L2}^{(max,MCS_{DL-L1L2}^{(k\_ul)})} \cdot 10^{(CQI_{average}^{(min)} - CQI_{average,UL}^{(k\_ul)} + \Delta_{k\_ul}^{(UL)})/10}, P_{UL-L1L2}^{(min)} \right\}$$

In formula (8)

$$P_{UL-L1L2}^{(max,MCS_{DL-L1L2}^{(k\_ul)})} \quad (B)$$

denotes the transmission power (absolute value) per one resource element of the Uplink Scheduling Grant when the CQI is the predetermined value $CQI_{average}^{(min)}$, and $P_{UL-L1L2}^{(min)}$ denotes the minimum value (absolute value) of the transmission power per one resource element of the Uplink Scheduling Grant. Further, $\Delta_{k\_}^{(UL)}$ denotes a fixed offset value. Each of the formula (B), $CQI_{average}^{(min)}$, $P_{UL-L1L2}^{(min)}$ and $\Delta_{k\_ul}^{(UL)}$ is set through the external input interface (IF). Further, the superscript suffix $MCS_{DL-L1L2}^{(k\_ul)}$ in the formula (B) denotes an index indicating the MCS No. of the UL scheduling Grant to be transmitted to the user equipment (UE) terminal #k_ul. Namely, by defining the formula (B) with respect to each MCS, adequate transmission power control may become possible with respect to each MCS.

In formula (8), the transmission power is controlled so as not to be equal to or less than the minimum value $P_{UL-L1L2}^{(min)}$. However, the transmission power may be controlled so as not to be equal to or less than the minimum value and so as not to be equal to or greater than the maximum value at the same time as well.

Then, the following formula (9) is calculated. Based on formula (6), a total of a sum of the transmission power used by each Downlink Scheduling information to be transmitted in the sub-frame and a sum of the transmission power used by each Uplink Scheduling Grant to be transmitted by the sub-frame is calculated.

$$P_{all} = \sum_{k\_dl=0}^{K\_DL-1} n_{DL-L1L2,tmp}^{(MCS_{DL-L1L2}^{(k\_dl)})} \cdot P_{DL-L1L2,tmp}^{(k\_dl)} + \quad (9)$$

$$\sum_{k\_ul=0}^{K\_UL-1} n_{UL-L1L2,tmp}^{(MCS_{DL-L1L2}^{(k\_ul)})} \cdot P_{DL-L1L2,tmp}^{(k\_ul)}$$

On the other hand, among the maximum transmission power resources that can be transmitted by the base station apparatus 200, as the transmission power resource for the Downlink Scheduling Information and the Uplink Scheduling Grant, an extra transmission power resource other than the transmission power resource to be used for other data of the Physical Downlink Control Channel (PDCCH) is allocated. Namely, when assuming that the number of OFDM symbols allocated to the Physical Downlink Control Channel (PDCCH) is one (1) (i.e., M=1), the transmission power $P_{DL/UL-L1L2}^{(1)}$ that can be allocated to the Downlink Scheduling Information and the Uplink Scheduling Grant is calculated using formula (10).

$$P_{DL/UL-L1L2}^{(1)} = P_{max} - n_{DLRS} \cdot P_{DLRS} - n_{cat0} \cdot P_{cat0} - \quad (10)$$

$$n_{OLI} \cdot P_{OLI}^{(MT)} - \sum_{l=0}^{L_{ACK}-1} n_{ACK} \cdot P_{ACK,tmp}^{(l)} - \sum_{k=0}^{K_{TPC}-1} n_{TPC} \cdot P_{TPC,tmp}^{(k)}$$

Further, when assuming that the number of OFDM symbols allocated to the Physical Downlink Control Channel (PDCCH) is two (2) (i.e., M=2), the transmission power $P_{DL/UL-L1L2}^{(2)}$ that can be allocated to the Downlink Scheduling Information and the Uplink Scheduling Grant is calculated using formula (11).

$$P_{DL/UL-L1L2}^{(2)} = 2 \cdot P_{max} - n_{DLRS} \cdot P_{DLRS} - n_{cat0} \cdot P_{cat0} - \quad (11)$$

$$n_{OLI} \cdot P_{OLI}^{(MT)} - \sum_{l=0}^{L_{ACK}-1} n_{ACK} \cdot P_{ACK,tmp}^{(l)} - \sum_{k=0}^{K_{TPC}-1} n_{TPC} \cdot P_{TPC,tmp}^{(k)}$$

Then, based on $N_{all}$ and $P_{all}$ obtained as described above, the number of OFDM symbols allocated to the Physical Downlink Control Channel (PDCCH) is determined.

When $P_{all}$ is less than $P_{DL/UL-L1L2}^{(1)}$ and $N_{all}$ is less than $N_{th1}$ (j), M is 1.

When $P_{all}$ is equal to or greater than $P_{DL/UL-L1L2}^{(1)}$ or $N_{all}$ is equal to or greater than $N_{th1}$ (j), $P_{all}$ is less than $P_{DL/UL-L1L2}^{(2)}$ and $N_{all}$ is less than $N_{th2}$ (j), M is 2.

In a case other than above, M is 3.

The values of $N_{th1}$ (j) and $N_{th2}$ (j) are fixed values set through the external input interface (IF). The symbol j denotes an index indicating the system bandwidth. For example, it is assumed that when j=0, 1, and 2, the system bandwidth is 5 MHz, 10 MHz, and 20 MHz, respectively.

The above descriptions may be summarized as follows. The number and the transmission power of the resource elements to be used for each Downlink Scheduling Information transmitted in the sub-frame and the number and the total transmission power of the resource elements to be used for each Uplink Scheduling Grant transmitted in the sub-frame are calculated, and based on the total number and the transmission power of the resource elements, the number M of OFDM symbols allocated to the Physical Downlink Control Channel (PDCCH) is determined.

In the example described above, the number M of OFDM symbols allocated to the Physical Downlink Control Channel (PDCCH) is determined based on the numbers and the transmission power of the resource elements for each Downlink Scheduling Information and each Uplink Scheduling Grant transmitted in the sub-frame. This is essentially equivalent to a case where the number M of OFDM symbols allocated to the Physical Downlink Control Channel (PDCCH) is determined based on the numbers and the transmission power of the blocks for the control channel used for each Downlink Scheduling Information and each Uplink Scheduling Grant transmitted in the sub-frame. Namely, the base station apparatus 200 may determine the number M of OFDM symbols allocated to the Physical Downlink Control Channel (PDCCH) based on the numbers and the transmission power of the blocks for the control channel used for each Downlink Scheduling Information and each Uplink Scheduling Grant transmitted in the sub-frame.

Further, in the example described above, the number M of OFDM symbols allocated to the Physical Downlink Control Channel (PDCCH) is determined based on the numbers and the transmission power of the resource elements for each Downlink Scheduling Information and each Uplink Scheduling Grant transmitted in the sub-frame. However, alternatively, the number M of OFDM symbols allocated to the Physical Downlink Control Channel (PDCCH) may be determined based on only the numbers of the resource elements for each Downlink Scheduling Information and each Uplink Scheduling Grant transmitted in the sub-frame. Otherwise, the number M of OFDM symbols allocated to the Physical Downlink Control Channel (PDCCH) may be determined based on only the transmission power of the resource elements for each Downlink Scheduling Information and each Uplink Scheduling Grant transmitted in the sub-frame.

Figure 8:
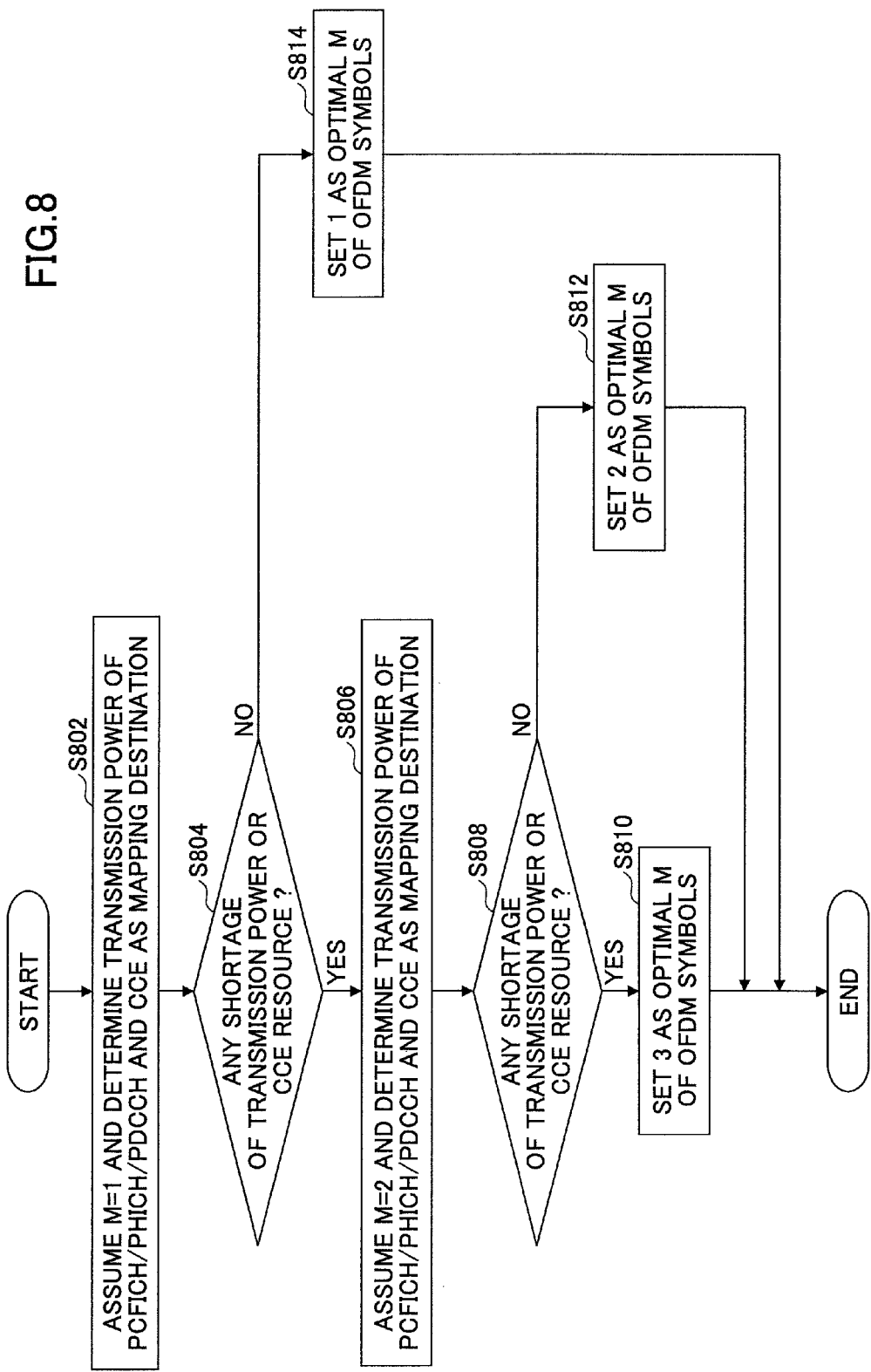
FIG. 8 is a flowchart showing a process of determining the number of OFDM blocks used for a Physical Downlink Control Channel (PDCCH)

Otherwise, more generally, the most appropriate number M of OFDM symbols may be determined based on the flowchart shown in FIG. 8.

As shown in flowchart of FIG. 8, in step S802, it is assumed that M=1, and the transmission power of the Physical Control Format Indicator Channel (PCFICH), the Physical Hybrid ARQ Indicator Channel (PHICH), and the Physical Downlink Control Channel (PDCCH) and the Control Channel Element (CCE) to be mapped are determined. The Control Channel Element (CCE) is a resource for the control channel and includes plural resource elements.

In this process, for example, the transmission power of the PCFICH, the PHICH, and the PDCCH and the number of the Control Channel Elements (CCEs) may be calculated based on the method described above. Further, for example, the transmission power of the PCFICH and the number of the CCEs may be defined through the external input interface (IF). Further, for example, the transmission power of the PHICH may be calculated based on the Wideband CQI reported from the user equipment (UE). Further, for example, the transmission power of the Downlink Scheduling Information and the Uplink Scheduling Grant to be mapped to the PDCCH and the number of the CCEs may be calculated using formula (7) and formula (8), respectively.

In step S804, it is determined whether there is a shortage of the transmission power resource or the CCE resource. When determining that there is a shortage of the transmission power resource or the CCE resource (YES in step S804), the process goes to step S806. In step S806, it is assumed that M=2, and the transmission power of PCFICH, PHICH, and PDCCH and the Control Channel Element (CCE) to be mapped are determined.

Then, in step S808, it is determined whether there is a shortage of the transmission power resource or the CCE resource. When determining that there is a shortage of the transmission power resource or the CCE resource (YES in step S808), the process goes to step S810. In step S810, the number M of OFDM symbols is set to 3 as the most adequate value.

On the other hand, when determining that there is no shortage of the transmission power resource or the CCE resource (NO in step S808), the process goes to step S812. In step S812, the number M of OFDM symbols is set to 2 as the most adequate value.

On the other hand, when determining that there is no shortage of the transmission power resource or the CCE resource (NO in step S804), the process goes to step S814. In step S814, the number M of OFDM symbols is set to 1 as the most adequate value.
(End of Determination Formula)

Finally, the transmission power $P_{DL-L1L2,m}^{(k\_dl)}$ (absolute value, unit: W) per one resource element in OFDM symbol m of the user equipment (UE) terminal #k_dl and the transmission power $P_{UL-L1L2,m}^{(k\_ul)}$ (absolute value, unit: W) per one resource element in OFDM symbol m of the user equipment (UE) terminal #k_ul are calculated as follows.

A case where M=1 is described.
$P_{DL-L1L2,m}^{(k\_dl)}$ and $P_{UL-L1L2,m}^{(k\_ul)}$ are calculated as follows.

$$P_{DL-L1L2,0}^{(k\_dl)} = P_{DL-L1L2,tmp}^{(k\_dl)}$$

$$P_{UL-L1L2,0}^{(k\_ul)} = P_{UL-L1L2,tmp}^{(k\_ul)}$$

Next, a case where M=2 is described.
$P_{DL-L1L2,m}^{(k\_dl)}$ and $P_{UL-L1L2,m}^{(k\_ul)}$ are calculated as follows.

$$P_{DL-L1L2,m}^{(k\_dl)} = P_{DL-L1L2,tmp}^{(k\_dl)} \cdot \frac{n_{DL-L1L2}^{(MCS_{DL-L1L2,m}^{(k\_dl)})}}{\sum_{m=0}^{M_{L1L2}-1} n_{DL-L1L2}^{(MCS_{DL-L1L2,m}^{(k\_dl)})}} \quad (12)$$

$$P_{UL-L1L2,m}^{(k\_ul)} = P_{UL-L1L2,tmp}^{(k\_ul)} \cdot \frac{n_{UL-L1L2}^{(MCS_{DL-L1L2,m}^{(k\_ul)})}}{\sum_{m=0}^{M_{L1L2}-1} n_{UL-L1L2}^{(MCS_{DL-L1L2,m}^{(k\_ul)})}} \quad (13)$$

Herein, (C)
$$n_{DL-L1L2}^{(MCS_{DL-L1L2,m}^{(k\_dl)})}$$

denotes the number of resource elements for the Downlink Scheduling Information in the $m^{th}$ OFDM symbol when the MCS of the Downlink Scheduling Information of the user equipment (UE) terminal #k_dl is $MCS_{DL-L1/L2,m}^{(k\_dl)}$. Further, $$n_{UL-L1L2}^{(MCS_{DL-L1L2,m}^{(k\_ul)})} \quad (D)$$

denotes the number of resource elements for the Uplink Scheduling Grant in the $m^{th}$ OFDM symbol when the MCS of the Uplink Scheduling Grant of the user equipment (UE) terminal #k_ul is $MCS_{DL-L1/L2,m}^{(k\_ul)}$. Namely, the formulas (12) and (13) indicate that the transmission power for the Downlink Scheduling Information and the Uplink Scheduling Grant in each OFDM symbol are determined in accordance with the number of the resource elements for the Downlink Scheduling Information and the Uplink Scheduling Grant, respectively, in the corresponding OFDM symbol.

Alternatively, regardless of the value of M, $P_{DL-L1L2,m}^{(k\_dl)}$ and $P_{UL-L1L2,m}^{(k\_ul)}$ may be calculated based on $$P_{DL-L1L2,m}^{(k\_dl)} = P_{DL-L1L2,tmp}^{(k\_dl)}$$

$$P_{UL-L1L2,m}^{(k\_ul)} = P_{UL-L1L2,tmp}^{(k\_ul)}$$

The symbol m denotes the index of the OFDM symbol. In this case, regardless of the value of M and regardless of the OFDM symbol as the mapping target, the transmission power per one resource element for the Downlink Scheduling Information and the Uplink Scheduling Grant related to the user equipment (UE) terminal #k_dl or #k_ul becomes constant.

When the total transmission power of the base station apparatus 200 based on the transmission power of all the OFDM symbols exceeds the maximum transmission power (rated power) of the base station apparatus 200, the transmission power $P_{DL-L1L2,m}^{(k\_dl)}$ and $P_{UL-L1L2,m}^{(k\_ul)}$ of the Downlink Scheduling Information and the Uplink Scheduling Grant, respectively, may be decreased so that the total transmission power of the base station apparatus 200 does not exceed the rated power of the base station apparatus 200. In this case, however, the base station apparatus 200 may not decrease the transmission power of all of signals, i.e. DL RS, Downlink L1/L2 Control Channel Format Indicator, Overload Indicator, UL ACK/NACK, or TCP bit. Alternatively, not only the transmission power of the Downlink Scheduling Information and the Uplink Scheduling Grant but also the transmission power of the information mapped to any Physical Downlink Control Channel may be decreased. In this case, however, the transmission power of the DL RS is not decreased. Further, alternatively, the transmission power of not only the Downlink Scheduling Information and the Uplink Scheduling Grant but also the DL RS and the data to be mapped to any Physical Downlink Control Channel may be decreased.

Further, in the above case where the transmission power of the Downlink Scheduling Information and the Uplink Scheduling Grant is decreased, the transmission power of the Downlink Scheduling Information for the RACH response, the transmission power of the Downlink Scheduling Information for the Paging Channel (PCH), and the transmission power of the Uplink Scheduling Grant for the Message 3 in the random access procedure may not be decreased. In this case, the communications quality of the Downlink Scheduling Information for the RACH response, the Downlink Scheduling Information for the Paging Channel (PCH), and the Uplink Scheduling Grant for the Message 3 in the random access procedure may be maintained.

A case where M=3 is described.

By using formula (14) below, it is determined whether the number of "the user equipment (UE) terminals selected as the user equipment (UE) terminals communicating using the shared channel in the sub-frame" in the scheduling of downlink user data and the uplink user data in the MAC processing section 2082 is appropriate.

First, similar to the above cases where M=1 (formula (10)) and M=2 (formula (11)), the transmission power $P_{DL/UL-L1L2}^{(3)}$ is calculated that can be allocated to the Downlink Scheduling Information and the Uplink Scheduling Grant when assuming that the number M of OFDM symbols allocated to the Physical Downlink Control Channel (PDCCH) is 3.

$$P_{DL/UL-L1L2}^{(3)} = 3 \cdot P_{max} - n_{DLRS} \cdot P_{DLRS} - n_{cat0} \cdot P_{cat0} - n_{OLI} \cdot P_{OLI}^{(MT)} - \sum_{l=0}^{L_{ACK}-1} n_{ACK} \cdot P_{ACK,tmp}^{(l)} - \sum_{k=0}^{K_{TPC}-1} n_{TPC} \cdot P_{TPC,tmp}^{(k)} \quad (14)$$

When $P_{all} > P_{DL/UL-L1L2}^{(3)}$ is satisfied, until $P_{all} \leq P_{DL/UL-L1L2}^{(3)}$ is satisfied, it is determined that the communications using the shared channel in the sub-frame are not carried out for the user equipment terminal in the order of DL, UL, DL, UL, DL, . . . and in the order of ascending priorities based on scheduling coefficients, the user equipment terminal being selected as the user equipment terminal to communicate using the shared channel in the sub-frame. Namely, the Downlink Scheduling Information or the Uplink Scheduling Grant is not transmitted in the sub-frame to the user equipment (UE) terminal. As a result, the corresponding Downlink-Shared Channel (DL-SCH) is not transmitted in the sub-frame to the user equipment (UE) terminal. Further, in the corresponding sub-frame, the user equipment (UE) terminal does not transmit the Uplink-Shared Channel (UL-SCH).

Then, later, among the rest of the user equipment (UE) terminals, the resource allocation of the Downlink-Shared Channel (DL-SCH) and the Uplink-Shared Channel (UL-SCH) is performed. The resource allocation herein refers to mainly the allocation of frequency resources, i.e., the allocation of resource blocks. The $P_{all}$ is calculated using the formula (9).

The scheduling coefficient refers to a coefficient indicating the priority level related to each user equipment (UE) terminal calculated in the scheduling process by the MAC processing section 2082 in the sub-frame. In other words, the scheduling coefficient refers to an evaluation metric. For example, the scheduling coefficient may be calculated based on at least one of the priority level of the data to be transmitted, radio quality information reported from user equipment (UE) terminal, the number of retransmissions, information whether control information is included, frequency of allocation, average transfer rate to the user equipment (UE) terminal, a target value of the data rate to the user equipment (UE) terminal, the priority level for preferentially transmitting to the user equipment (UE) terminal when the user equipment terminal capable of DRX mode is in a reception timing mode in DRX, I.e. on-duration, and the like.

Further, the DL transmission power determination section 2084 may increase the priority level of downlink and uplink retransmission data in a process of determining that the communications using the shared channel are not carried out in the sub-frame with respect to the user equipment terminal selected as the user equipment terminal to communicate using the shared channel in the sub-frame. Namely, the transmission power may be preferentially allocated to the Downlink Scheduling Information for the retransmission data and the Uplink Scheduling Grant for the retransmission data. Further, the DL transmission power determination section 2084 may increase the priority level of the message 2 (RA response) in the downlink random access procedure or the Paging Channel (PCH) in a process of determining that the communication using the shared channel is not performed in the sub-frame with respect to the user equipment terminal selected as the user equipment terminal to communicate using the shared channel in the sub-frame as described above. Namely, the transmission power may be preferentially allocated to the Downlink Scheduling Information for the message 2 in the downlink random access procedure or the Paging Channel (PCH). Further, in addition to the priority level of the message 2 in the downlink random access procedure or the Paging Channel (PCH) that are common channels, the priority level for the Broadcast Channel (BCH) may be increased.

Further, in the above example, a case is described where after the process of determining that the communications using the shared channel are not carried out in the sub-frame with respect to the user equipment terminal selected as the user equipment terminal to communicate using the shared channel in the sub-frame, then, among the rest of the user equipment (UE) terminals, the resource allocation of the Downlink-Shared Channel (DL-SCH) and the Uplink-Shared Channel (UL-SCH) is performed. However, alternatively, after the resource allocation of the Downlink-Shared Channel (DL-SCH) and the Uplink-Shared Channel (UL-SCH) is performed with respect to the user equipment terminal selected as the user equipment terminal to communicate using the shared channel in the sub-frame, the process may be performed where the communications using the shared channel are not carried out in the sub-frame with respect to the user equipment terminal selected as the user equipment terminal to communicate using the shared channel in the sub-frame. In this case, the resources of the Downlink-Shared Channel (DL-SCH) and the Uplink-Shared Channel (UL-SCH) for the user equipment (UE) terminal that is determined not to communicate using the shared channel in the subframe may not be used. However, processing delay may be reduced.

Further, in the above example, when M=3, until $P_{all} \leq P_{DL/UL-L1L2}^{(3)}$ is satisfied, it is determined that the communications using the shared channel in the sub-frame are not carried out for the user equipment terminal selected as the user equipment terminal to communicate using the shared channel in the sub-frame. However, alternatively, similar to the cases where M=1 and M=2, when $P_{all} > P_{DL/UL-L1L2}^{(1)}$ or $P_{all} > P_{DL/UL-L1L2}^{(2)}$ is satisfied, respectively, the transmission power of the Downlink Scheduling Information and the Uplink Scheduling Grant may be decreased so that $P_{all} \leq P_{DL/UL-L1L2}^{(1)}$ or $P_{all} > P_{DL/UL-L1L2}^{(2)}$ is satisfied, respectively.

Finally, $P_{DL-L1L2,m}^{(k\_dl)}$ and $P_{UL-L1L2,m}^{(k\_ul)}$ are calculated as described below.

$$P_{DL-L1L2,m}^{(k\_dl)} = P_{DL-L1L2,tmp}^{(k\_dl)} \cdot \frac{n_{DL-L1L2}^{(MCS_{DL-L1L2}^{(k\_dl)},m)}}{\sum_{m=0}^{M_{L1L2}-1} n_{DL-L1L2}^{(MCS_{DL-L1L2}^{(k\_dl)},m)}} \quad (15)$$

$$P_{UL-L1L2,m}^{(k\_ul)} = P_{DL-L1L2,tmp}^{(k\_ul)} \cdot \frac{n_{UL-L1L2}^{(MCS_{DL-L1L2}^{(k\_ul)},m)}}{\sum_{m=0}^{M_{L1L2}-1} n_{UL-L1L2}^{(MCS_{DL-L1L2}^{(k\_ul)},m)}}$$

Otherwise, as described above, regardless of the value of M, $P_{DL-L1L2,m}^{(k\_dl)}$ and $P_{UL-L1L2,m}^{(k\_ul)}$ are calculated based on $$P_{DL-L1L2,m}^{(k\_dl)} = P_{DL-L1L2,tmp}^{(k\_dl)}$$

$$P_{UL-L1L2,m}^{(k\_ul)} = P_{UL-L1L2,tmp}^{(k\_ul)}$$

Herein, m denotes the index of OFDM symbols. In this case, regardless of the value of M and regardless of the OFDM symbol as the mapping target, the transmission power per one resource element for the Downlink Scheduling Information and the Uplink Scheduling Grant related to the user equipment (UE) terminal #k_dl or #k_ul becomes constant.

In the above embodiment, a case is described where the Downlink L1/L2 Control Channel Format Indicator is transmitted via the Physical Downlink Control Channel (PDCCH). However, in a case where the Downlink L1/L2 Control Channel Format Indicator is not transmitted, the above control based on the predetermined fixed value M=1, 2, or 3 is performed. In this case, the value of M is not controlled with respect to each sub-frame but controlled with respect to each longer period (cycle) such as 10 ms or 100 ms. In this case as well, the process from (Start of determination formula) to (End of determination formula) may also be applied. However, in this case, as the value of transmission power and the number of resource elements, not an instantaneous value (i.e., a value of each sub-frame) but averaged values of the longer period such as 10 ms or 100 ms may be used. Otherwise, as the value of transmission power and the number of resource elements, the maximum values in the longer period may be used. When the maximum values are used, as the value of M, a value may be set that does not lead to any shortage of the number of resource elements and the transmission power of the Downlink Scheduling Information and the Uplink Scheduling Grant in all sub-frames; therefore it may become possible to achieve more stable communications using the control channel.

Otherwise, an adequate number of OFDM symbols in each subframe in a longer period may be calculated; and the average value or the maximum value of the adequate number of OFDM symbols in the above longer period may be calculated and used as the value of M. Herein, the adequate number of OFDM symbols refers to the minimum value of M among the values of M which do not lead to any shortage of the number of resource elements and the transmission power in the subframe.

Otherwise, even when, in the Physical Downlink Control Channel (PDCCH), the Downlink L1/L2 Control Channel Format Indicator is transmitted every one sub-frame (i.e., every 1 ms), the number M of OFDM symbols allocated to the Physical Downlink Control Channel (PDCCH) may also be determined based on a longer period. For example, based on 10 ms or 100 ms as the longer period, the average value of $N_{all}$ and the average value of $P_{all}$ may be calculated to determine the value of M. Otherwise, the value of M may be determined based on the maximum value of $N_{all}$ and the maximum value of $P_{all}$ in a 10 ms period or 100 ms period. In this case, the Downlink L1/L2 Control Channel Format Indicator is transmitted in every sub-frame. However, the value of M is fixed during the control period such as 10 ms or 100 ms as described above. As described above, by controlling the value of M in the longer period, it is no longer necessary to calculate the value of M in every sub-frame and it may become possible to decrease the complexity of base station apparatuses.

Figure 9:
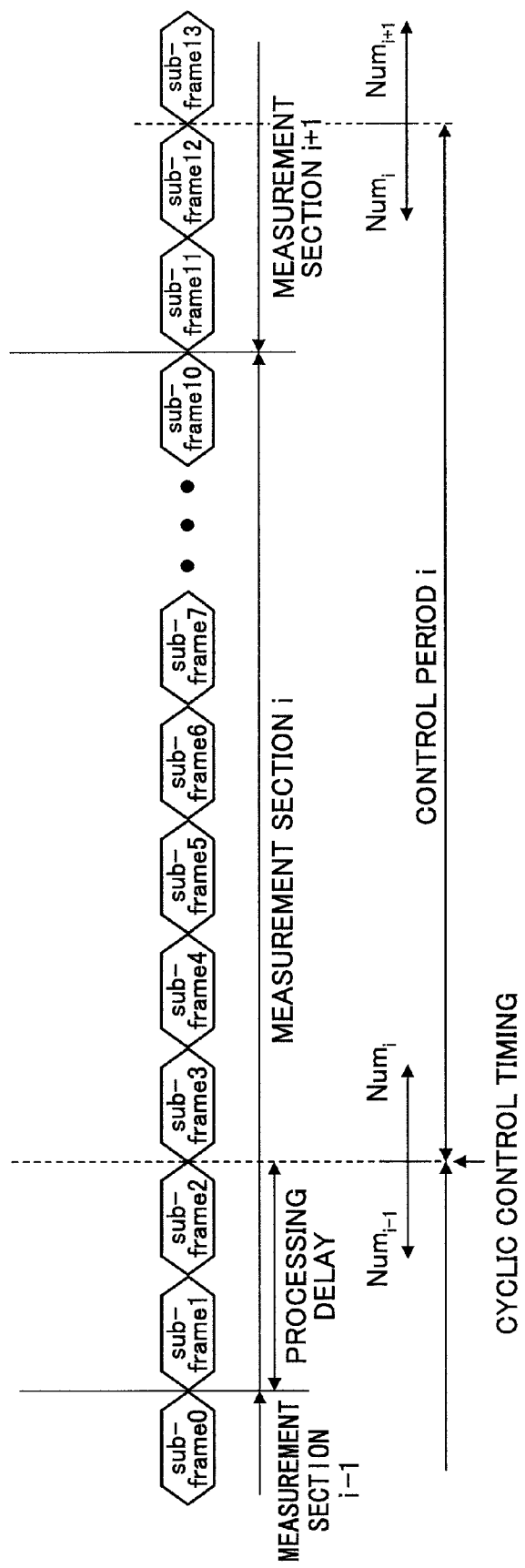
FIG. 9 is a drawing showing a method of determining the number of OFDM symbols used for the Physical Downlink Control Channel (PDCCH)

FIG. 9 schematically shows a concept of this control. In FIG. 9, a value of Num corresponds to the number (value) of M. Further, the value of Num may be changed at periodic control timings (in FIG. 9, at border lines between sub-frame 2 and sub-frame 3 and between sub-frame 12 and sub-frame 13). The value of M in the control period i (i.e., value of $Num_i$) is determined based on the value of $N_{all}$ and the value of $P_{all}$ in the measurement section i−1.

Otherwise, the value of M may be determined based on the number of times when the total transmission power of the base station apparatus 200 exceeds the maximum transmission power (rated power) of the base station apparatus 200 in the longer period such as 10 ms or 100 ms as described above. For example, in a case where the number M of OFDM symbols allocated to the Physical Downlink Control Channel (PDCCH) is controlled in every 10 ms period, when M=2 is set in a certain control period (10 ms) and if the total transmission power of the base station apparatus 200 exceeds the maximum transmission power (rated power) of the base station apparatus 200 three (3) times or more within the 10 ms, the value of M may be increased by 1 (i.e., M=3) as the control of the value of M. On the contrary, when the total transmission power of the base station apparatus 200 does not exceed the maximum transmission power (rated power) of the base station apparatus 200 during a period of 100 ms or more, the value of M may be decreased by 1 as the control of the value of M. In this case, the Downlink L1/L2 Control Channel Format Indicator is transmitted in every sub-frame. However, the value of M is fixed during the control period such as 10 ms or 100 ms as described above. As describe above, by controlling the value of M in a longer period (cycle), it is no longer necessary to calculate the value of M in every sub-frame and it may become possible to decrease the complexity of base station apparatuses.

Even in a case where the control is performed based on a longer period (cycle), when there is a shortage of transmission power resource for the Downlink Scheduling Information and the Uplink Scheduling Grant or when there is a shortage in the number of the resource elements used for the Downlink Scheduling Information and the Uplink Scheduling Grant, the above-mentioned processes may be performed that decreases the transmission power and that determines that the communications using the shared channel in the sub-frame are not carried out for the user equipment terminal selected as the user equipment terminal to communicate using the shared channel in the sub-frame.

On the other hand, when the total transmission power of the base station apparatus 200 exceeds the maximum transmission power (rated power) of the base station apparatus 200, in other words, when there is a shortage of transmission power resource for the Downlink Scheduling Information and the Uplink Scheduling Grant or when there is a shortage in the number of the resource elements used for the Downlink Scheduling Information and the Uplink Scheduling Grant, the value of M may be immediately changed regardless of the longer control period such as 10 ms or 100 ms as described above. Namely, in an event that the total transmission power of the base station apparatus 200 exceeds the maximum transmission power (rated power) of the base station apparatus 200, the value of M may be increased in the next sub-frame or in the sub-frame as early as possible as the control of the value of M. In the above process, the number of control channel resource elements may be substituted for the number of resource elements.

Figure 10:
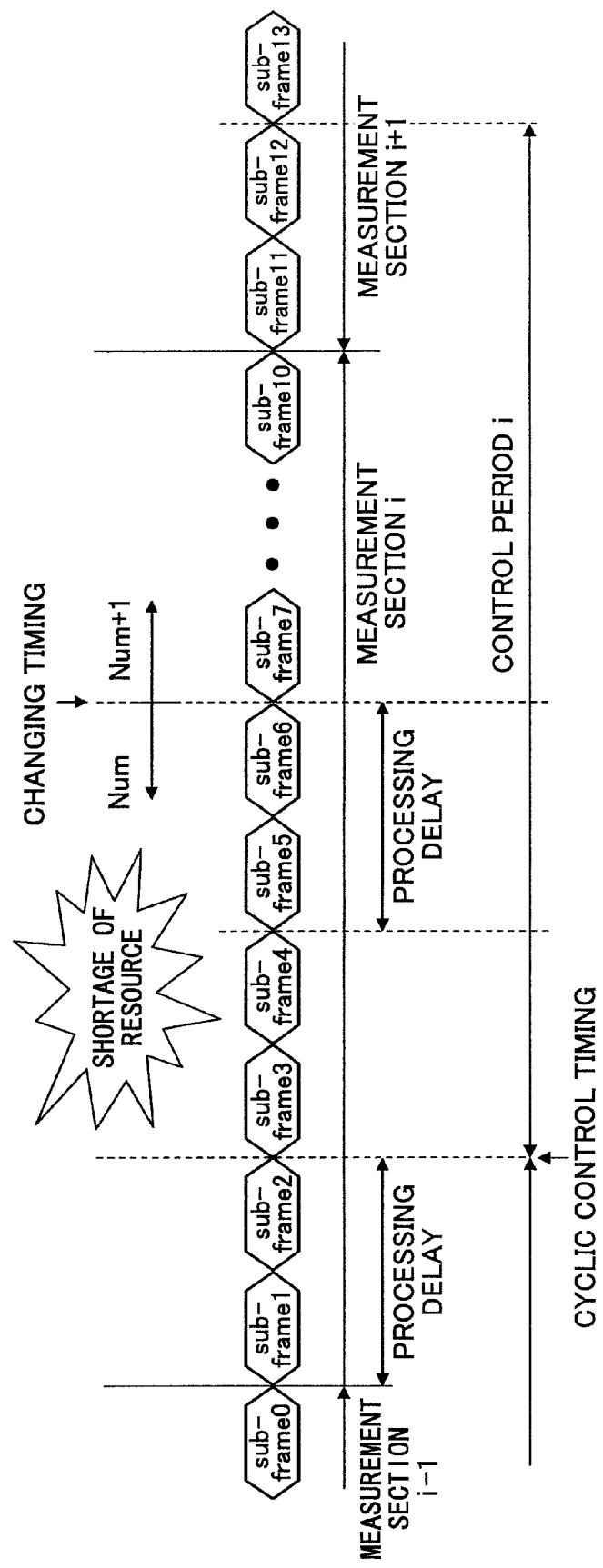
FIG. 10 is a drawing showing another method of determining the number of OFDM symbols used for the Physical Downlink Control Channel (PDCCH)

FIG. 10 shows a concept of this control. In FIG. 10, the value of Num corresponds to the number (value) of M. Further, the value of Num may be changed at periodic control timings (in FIG. 10, at border lines between sub-frame 2 and sub-frame 3 and between sub-frame 12 and sub-frame 13). Further, in sub-frame 4, there is a shortage of the transmission power resource for the Downlink Scheduling Information and the Uplink Scheduling Grant or there is a shortage in the number of the resource elements used for the Downlink Scheduling Information and the Uplink Scheduling Grant. As a result of the shortage, the value of M is changed at the border line between sub-frame 6 and sub-frame 7. In this case, for example, the number of OFDM symbols is increased by 1. As described above, in addition to the periodic control, by immediately changing the value of Num (i.e., the number of M) upon a shortage of the resource, it may become possible to achieve more stable communication quality of the Downlink Scheduling Information and the Uplink Scheduling Grant.

Further, also in a case where the value of M is calculated in a longer control period (cycle) such as 10 ms or 100 ms as described above, the base station apparatus 200 may perform a process of temporarily changing the value of Num (i.e., value of M) based on whether a common channel such as the Dynamic BCH, the Paging Channel (PCH), or the DL scheduling Information is transmitted in the sub-frame. Namely, the value of M may be changed at a changing timing other than the periodic changing timing described above.

Figure 11:
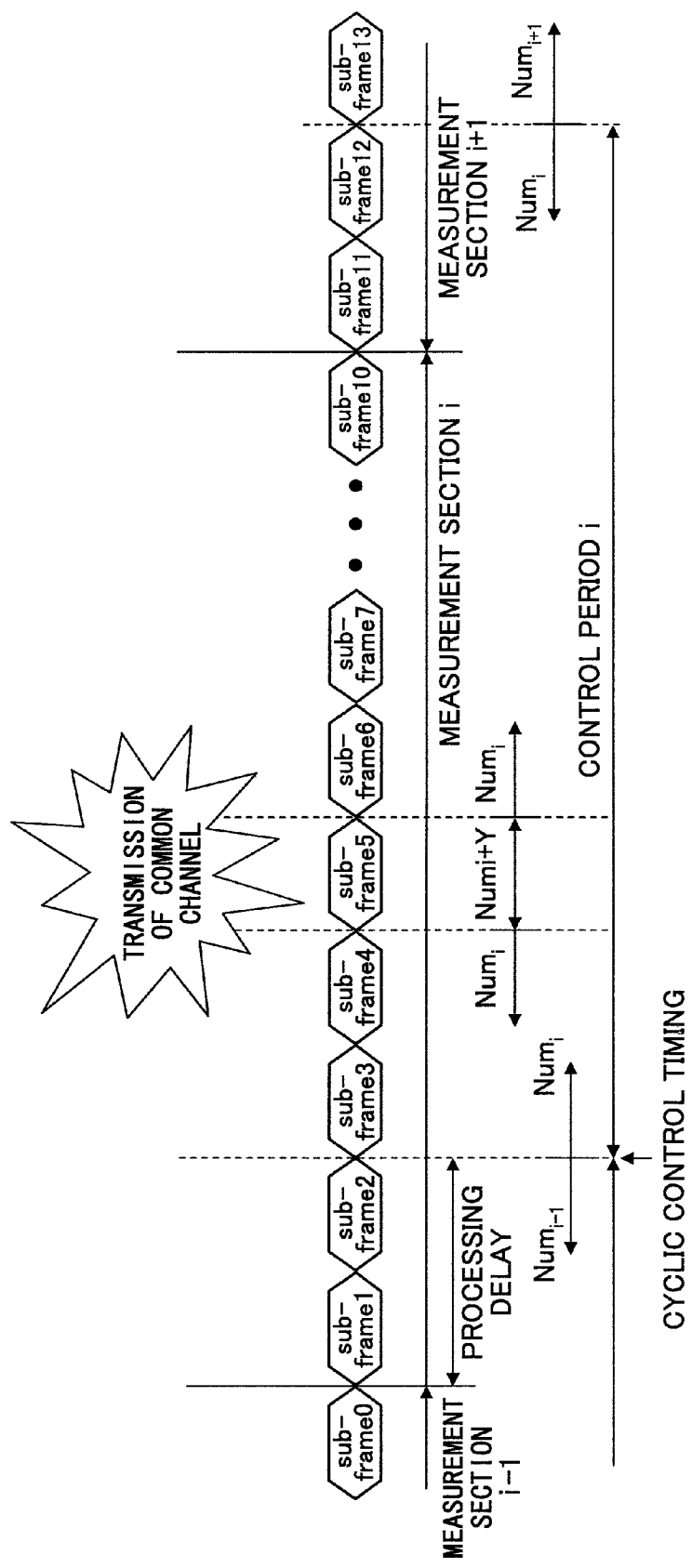
FIG. 11 is a drawing showing another method of determining the number of OFDM symbols used for the Physical Downlink Control Channel (PDCCH).

FIG. 11 shows a concept of this control. In FIG. 11, the value of Num corresponds to the number (value) of M. Further, the value of Num may be changed at periodic control timings (in FIG. 11, at border lines between sub-frame 2 and sub-frame 3 and between sub-frame 12 and sub-frame 13). Further, in sub-frame 5, a common channel is transmitted, the value of Num is temporarily changed from $Num_i$ to $Num_i+Y$. The Downlink Scheduling Information for the common channel uses more resources so that a mobile station at cell edge can correctly receive data. Herein, the resources correspond to the transmission power and the number of resource elements. Namely, there is a high possibility of resource shortage in the sub-frame where the common channel is transmitted.

Therefore, as described above, in addition to the periodic control, by temporarily changing the value of Num (i.e., the number of M) in accordance with the transmission of the common channel, it may become possible to achieve more stable communication quality of the Downlink Scheduling Information and the Uplink Scheduling Grant. The transmission timing of the common channel is generally known; therefore, the changed process as described above may be achieved easily.

The value of Y may be determined based on a type of common channel to be transmitted in the sub-frame, resource usage, and the number of common channels.

Further, a similar process may be performed based on not only whether a common channel is to be transmitted but also whether a predetermined channel other than the common channel is to be transmitted.

Otherwise, the value of M may be determined based on the number of the symbols of the Physical Downlink Control Channel (PDCCH), i.e., the number of resource elements or the number of times when there is a shortage of control channel resource elements in the longer period (cycle) such as 10 ms or 100 ms as described above. For example, in a case where the number M of OFDM symbols allocated to the Physical Downlink Control Channel (PDCCH) is controlled in every 10 ms period, when M=2 is set in a certain control period (10 ms) and if there is a shortage of the number of symbols of the Physical Downlink Control Channel (PDCCH), i.e., the number of resource elements, or if there is a shortage of control channel resource elements three times or more, the value of M may be increased by 1 (i.e., M=3) as the control of the value of M. On the contrary, when there is no shortage in the number of symbols of the Physical Downlink Control Channel (PDCCH), i.e., the number of resource elements, and there is no shortage of control channel resource element during a period of 100 ms or more, the value of M may be decreased by 1 as the control of the value of M. In this case, the Downlink L1/L2 Control Channel Format Indicator is transmitted in every sub-frame. However, the value of M is fixed during the control period such as 10 ms or 100 ms as described above. As described above, by controlling the value of M in a longer period (cycle), it is no longer necessary to calculate the value of M in every sub-frame and it may become possible to decrease the complexity of base station apparatuses. Otherwise, the number M of OFDM symbols allocated to the Physical Downlink Control Channel (PDCCH) may be determined based on the number of mobile stations in the cell 50, more specifically, the number of mobile stations in RRC connected condition, the number of mobile stations that are in the RRC connected state and that are not in DRX state, or the number of mobile stations having data to be transmitted to a downlink transmission buffer.

Otherwise, as described in the above example, the value of M is calculated in every sub-frame so that the calculated value of M is used in the same sub-frame where the value of M is calculated. However, alternatively, the calculated value of M may be used in the sub-frame which is several sub-frames after the sub-frame where the value of M is calculated. For example, when it is assumed that the calculated value of M is used in the sub-frame which is two sub-frames after the sub-frame where the value of M is calculated, the value of M calculated in sub-frame 4 is used in sub-frame 6. In this case, time that can be used to calculate the value of M may be extended; therefore, it may become possible to decrease the complexity of base station apparatuses.

In the above embodiments, an example of a system is described to which an Evolved UTRA and UTRAN (a.k.a. Long Term Evolution or Super 3G) may be applied. However, a base station apparatus and a communication control method according to an embodiment of the present invention may also be applied to any other system employing the OFDM (Orthogonal Frequency Division Multiplexing) scheme in downlink communication.

For explanation purposes, specific values are used to promote understanding the present invention. However, the values are for illustrative purpose only and any other suitable values may be used.

The present invention is described by referring to specific embodiments. However, the embodiments are for illustrative purpose only and a person skilled in the art may understand that the above embodiment is described for illustrative purpose only and may think of examples of various modifications, transformations, alterations, changes and the like. For illustrative purposes, the apparatus according to an embodiment of the present invention is described with reference to the functional block diagrams. However, such an apparatus may be provided by hardware, software, or a combination thereof. The present invention is not limited to the embodiment described above, and various modifications, transformations, alteration, exchanges, and the like may be made without departing from the scope and spirit of the present invention.

The present international application claims priority from Japanese Patent Application Nos. 2007-050835 filed on Feb. 28, 2007 and 2007-161939 filed on Jun. 19, 2007, the entire contents of which Japanese Patent Application Nos. 2007-050835 and 2007-161939 are hereby incorporated herein by reference.

The invention claimed is:

1. A base station apparatus capable of communicating with a plurality of user equipment terminals using a shared channel, the base station apparatus comprising:
a selection unit configured to select user equipment terminals to which radio resources are allocated based on priority levels indicating a priority order of allocating the radio resources for the shared channel; and
a resource determination unit configured to determine a transmission power of a control channel and resources for the control channel, the control channel indicating communications of the shared channel to the selected user equipment terminals, wherein
when a sum of the transmission power of the control channel related to the selected user equipment terminals exceeds a predetermined first threshold value or when a sum of control resources for the control channel related to the selected user equipment terminals exceeds a predetermined second threshold value, the resource determination unit transmits the control channel to some user equipment terminals among the selected user equipment terminals.

2. The base station apparatus according to claim 1, wherein the resource determination unit preferentially transmits the control channel to a user equipment terminal having retransmission data.

3. The base station apparatus according to claim 1, wherein the resource determination unit preferentially transmits the control channel to a user equipment terminal having data of a higher priority level.

4. The base station apparatus according to claim 1, wherein the resource determination unit preferentially transmits the control channel for a common channel.

5. The base station apparatus according to claim 1, wherein when the sum of the transmission power of the control channel related to the selected user equipment terminals exceeds a predetermined threshold value, the resource determination unit decreases the transmission power of the control channel so that the sum of the transmission power of the control channel is equal to the predetermined first threshold value.

6. The base station apparatus according to claim 5, wherein the resource determination unit does not decrease a transmission power of at least one of a downlink reference signal, a control channel to be transmitted to a user equipment terminal having retransmission data, a control channel to be transmitted to a user equipment terminal having data of a higher priority level, and a control channel for a common channel.

7. A communication control method employed in a base station apparatus capable of communicating with a plurality of user equipment terminals using a shared channel, the method comprising:
a first selection step of selecting user equipment terminals to which radio resources are allocated based on priority levels indicating a priority order of allocating the radio resources for the shared channel;
a determination step of determining a transmission power of a control channel and resources for the control channel, the control channel indicating communications of the shared channel to the selected user equipment terminals;
a second selection step of selecting user equipment terminals to which the radio resources are allocated based on the priority levels indicating the priority order of allocating the radio resources; and
a transmission power control step of controlling a transmission power of the control channel to the selected user equipment terminals, wherein
in the determination step, when a sum of the transmission power of the control channel related to the selected user equipment terminals exceeds a predetermined first threshold value or when a sum of control resources for the control channel related to the selected user equipment terminals exceeds a predetermined second threshold value, the control channel is transmitted to some user equipment terminals among the selected user equipment terminals.

* * * * *